United States Patent [19]

Eisig et al.

[11] Patent Number: 5,343,416
[45] Date of Patent: Aug. 30, 1994

[54] METHOD AND APPARATUS FOR RE-CONFIGURING A PARTIAL PRODUCT REDUCTION TREE

[75] Inventors: David Eisig; Jehoshua S. Rotstain, both of Haifa, Israel

[73] Assignee: Intel Corporation, Santa Clara, Calif.

[21] Appl. No.: 970,297

[22] Filed: Nov. 2, 1992

[51] Int. Cl.⁵ .............................................. G06F 7/52
[52] U.S. Cl. ................................................... 364/757
[58] Field of Search ............... 364/754, 757, 759, 760, 364/749, 709.01

[56]  References Cited

U.S. PATENT DOCUMENTS

| 4,598,382 | 7/1986 | Sato | 364/757 |
| 4,893,268 | 1/1990 | Denman, Jr. et al. | 364/759 |
| 5,046,038 | 9/1991 | Briggs | 364/765 |
| 5,144,576 | 9/1992 | Briggs | 364/754 |
| 5,229,958 | 7/1993 | Oinuma | 364/709.01 |

OTHER PUBLICATIONS

A. M. Odlyzko, "Lecture Notes in Computer Science 263" *Advances in Cryptology-CRYPTO '86* pp. 297–301, 1986.

I. B. Damgard, "Lecture Notes in Computer Science 473" *Advances in Cryptology-EUROCRYPT '90* pp. 230-244, 1990.

*Primary Examiner*—Long T. Nguyen
*Attorney, Agent, or Firm*—Blakely, Sokoloff, Taylor & Zafman

[57]  ABSTRACT

An apparatus is described for re-configuring a partial product reduction tree. The partial product reduction tree contains carry-save-adders and is represented by a plurality of rectangles and triangles, wherein each rectangle has a corresponding triangle such that a rectangle-triangle pair is formed for each rectangle. The apparatus includes a plurality of switches located between a corresponding plurality of the rectangle-triangle pairs such that each switch has an adjacent rectangle and an adjacent triangle. A first signal line extends from each switch to the switch's adjacent rectangle, a second signal line extends from each switch to the switch's adjacent triangle, and a third signal line extends from each switch to the rectangle of the rectangle-triangle pair which is adjacent to the switch. Each switch receives control signals which direct the switch to enter either of a first mode wherein the switch is configured to pass a signal from the second signal line to the first signal line or a second mode wherein the switch is configured to pass a signal from the third signal line to the first signal line.

6 Claims, 22 Drawing Sheets

```
         15  13  11
          ↓   ↓   ↓
          1 | 1        MULTIPLICAND   3
          1 | 0        MULTIPLIER     2
         ─────
            0 | 0      PARTIAL PRODUCTS
        1   1
         ─────
        1   1 | 0      FINAL SUM      6
```

FIGURE 1
(Prior Art)

```
                  1   1    MULTIPLICAND   3
            17    1   1    MULTIPLIER     3
          19  ↘ ─────
                  1   1    PARTIAL PRODUCTS
        21 ↘   1   1
              ─────────
           → 1  0   0   1  FINAL SUM      9
```

FIGURE 2
(Prior Art)

METHOD AND APPARATUS FOR RE-CONFIGURING A PARTIAL PRODUCT REDUCTION TREE

FIELD OF THE INVENTION

The present invention relates to processes and mechanisms for switching between partial product reduction tree configurations in multiplier circuits.

BACKGROUND OF THE INVENTION

Hardware implementations of numeric multiplication are often done in a manner similar to the way multiplication is done on paper. The basic process of these types of implementations of numeric multiplication can be broken down into three steps: (1) partial product generation; (2) partial product reduction; and (3) final addition. Texts on computer arithmetic which deal with multiplication commonly cover the general theory. One such book which presents the topic is "Introduction to Arithmetic for Digital Systems" by Waser and Flynn, and published by Holt, Rinehart and Winston. Applicants hereby refer to, and incorporate by reference the contents of "Introduction to Arithmetic for Digital Systems."

In order to define general terms and to explain the methodology of the above-mentioned three multiplication steps, a simple example of hand multiplication will be described. Turning to FIG. 1, a multiplicand "3" is multiplied with a multiplier "2." The binary representations of the two numbers are "11" and "10," respectively.

Each of the multiplicand and the multiplier are two bits in length. The multiplicand and the multiplier each have a least significant bit position and a most significant bit position. The least significant bit positions of the multiplicand and the multiplier form a least significant bit column, denoted in FIG. 1 at 11. The least significant bit column includes the rightmost "1" of the multiplicand and the "0" from the multiplier. The most significant bit positions of the multiplicand and the multiplier form a most significant bit column, denoted in FIG. 1 at 13. The most significant bit column is one order of significance up from the least significant bit column, and is hence denoted as the next-higher significant bit column.

Generally speaking, increasing higher significant bit columns ("higher columns") will be referred to as the first higher column, second higher column, etc., relative to a given column; and decreasing lower significant bit columns ("lower columns") will be referred to as the first lower column, second lower column, etc., relative to a given column. For example, relative to column 11 in FIG. 1, column 13 is the first higher column, and column 15 is the second higher column. Similarly, relative to column 15, column 13 is the first lower column, and column 11 is the second lower column. As a final definition, each column is defined as representing a level of significance, such that if each bit of a number is shifted to a first higher column, then the entire number is shifted left one level of significance.

With these definitions, the above-mentioned numeric multiplication process will be applied to the multiplicand and multiplier of FIG. 1. First, the "0" of the multiplier is multiplied with each bit of the multiplicand "11," yielding the first partial product "00". The second partial product is generated in a similar way by multiplying the "1" of the multiplier with the "11" of the multiplicand. Every bit of the resulting partial product "11" is shifted to a first higher column, relative to the columns of the first partial product. That is, the second partial product is shifted left one level of significance. The two partial products are then added to get the final sum of "110."

Turning now to FIG. 2, it is noted that, although the multiplication of FIG. 1 yielded a result three bits in length, multiplication of an n-bit number and an m-bit number generally produces a result up to n+m bits in length. For example, multiplication of a multiplicand of "11" and a multiplier of "11" yields a first partial product and a second partial product as shown at 17 and 19 in FIG. 2. The second partial product 19 is shifted left one level of significance. The sum of the two partial products is "1001, " which is four bits in length. This sum is shown at 21 in FIG. 2.

Rising to a conceptual level, FIG. 3 shows the general bit positions of a multiplicand 23 and a multiplier 25. The multiplicand 23 and the multiplier 25 are each four bits in length (i.e., m=n=4). Each of the four bit positions is represented by a small circle ("dot"). Looking at FIG. 3, we see that each of the four partial products 27, 29, 31, and 33 is consecutively shifted left one level of significance. The length of the final sum 35 is eight bits, which is the sum of m and n.

When the same multiply operation is performed in 2's complement arithmetic, the general bit positions take the form shown in FIG. 4. As is well known in the art, 2's complement arithmetic allows binary numbers to represent positive and negative values. The 2's complement of a binary number may be found by changing all of the "1"s to "0"s and changing all of the "0"s to "1"s. A "1" is then added to the result. Following this procedure, the 2"s complement of "0010" is found by changing the number to "1101" and then adding "1" to yield "1110." It is noted that the two leftmost zeros of "0010" became "1"s in the 2's complement representation.

Continuing with this logic, the leftmost bit positions of the partial products of FIG. 3 are not extended, but the leftmost bit positions of the partial products of the 2's complement partial products of FIG. 4 are extended. The shaded dots represent extended bit positions which are assigned binary "1" values. One such bit position is shown at 37 in FIG. 4.

As the number of bits in the operands increases, so does the number of partial products. Since speed is one of the major factors in multiplier implementations, there is a problem in summing the partial products. This is a problem of both software and hardware. For example, in a multiplier for multiplying two sixty-four bit operands, sixty-four partial products must be summed. There are several schemes for reducing the number of partial products, two of which will be discussed below.

A technique called Booths decoding is commonly used in the prior art to reduce the number of partial products by a factor of two or more. Even with a minimization scheme such as Booths decoding, however, the problem remains of quickly adding the remaining partial products with a minimum amount of circuitry.

A second approach in the prior art, which may be used in conjunction with the first approach, is the implementation of Carry-Save-Adders (CSAs), which are similar to full adders. A CSA is similar to a full adder in that it inputs three numbers and outputs two numbers. A tree of CSAs can be used to reduce a number of partial products to two numbers which can then be summed by a standard Carry-Propagate Adder. The prior art is full of various CSA schemes, perhaps in consequence of the complexity and costs of building these structures.

SUMMARY OF THE INVENTION

The present invention does not introduce a completely new approach to partial product reduction which renders the two above-mentioned approaches obsolete. Rather, the present invention recognizes the limitations of implementations of partial product reduction circuitry with regard to size and cost. Accordingly, the present invention seeks to conserve and use efficiently the computer resources dedicated to such operations.

The present invention incorporates existing partial product reduction techniques into a novel configuration which is re-configurable into alternative arrangements. In the presently preferred embodiment, the re-configurable partial product reduction tree can be switched between two separate arrangements, thus providing the functionality of two circuits in a single circuit.

In the presently preferred embodiment, the functionality referred to is multiplication of high precision numbers (sixty-four bits) as well as multiplication of a number of low precision (sixteen bit) numbers. This re-configurable implementation is at the expense of only a few switches and an additional amount of routing.

Below, an apparatus is described for re-configuring a partial product reduction tree. The partial product reduction tree is represented by a plurality of rectangles and triangles, wherein each rectangle has a corresponding triangle such that a rectangle-triangle pair is formed for each rectangle. The apparatus includes a plurality of switches located between a corresponding plurality of the rectangle-triangle pairs such that each switch has an adjacent rectangle and an adjacent triangle. A first signal line extends from each switch to the switch's adjacent rectangle, a second signal line extends from each switch to the switch's adjacent triangle, and a third signal line extends from each switch to the rectangle of the rectangle-triangle pair which is adjacent to the switch. Each switch receives control signals which direct the switch to enter either of a first mode wherein the switch is configured to pass a signal from the second signal line to the first signal line or a second mode wherein the switch is configured to pass a signal from the third signal line to the first signal line.

BRIEF DESCRIPTION OF THE DRAWINGS

FIG. 1 is a mathematical diagram showing the multiplication of two binary numbers;

FIG. 2 is a mathematical diagram showing the multiplication of two binary numbers to yield a four bit result;

DETAILED DESCRIPTION OF THE INVENTION

Figure 3:
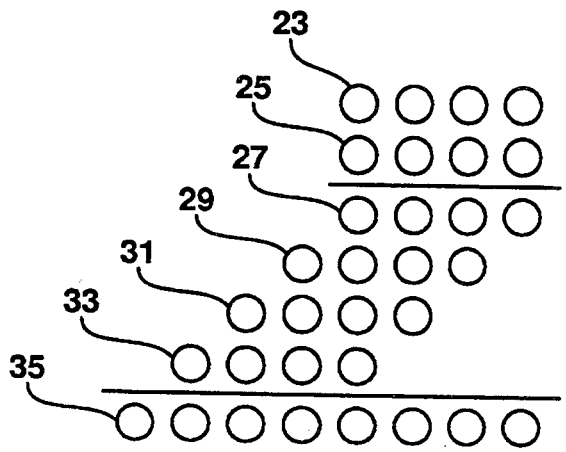
FIG. 3 is a schematic mathematical diagram showing the representative bit positions of a multiplication operation between two four bit numbers.

A method and apparatus for re-configuring a partial product reduction tree will now be described. In the following description, numerous specific details are set forth such as bit lengths, bus widths, etc., in order to provide a thorough understanding of the present invention. It will be evident, however, to those skilled in the art that these specific details need not be used to practice the present invention. In other instances, well-known structures and circuits have not been shown in detail in order to avoid unnecessarily obscuring the present invention.

The presently preferred embodiment utilizes a CMOS or Bi-MOS semiconductor chip with a microprocessor and a coprocessor etched thereon. The microprocessor contains the execution unit 408, which is described later with reference to FIG. 9. Looking briefly at FIG. 9, the semiconductor chip also contains interface circuitry 414 etched thereon. The interface circuitry is adapted for interfacing a keyboard 410, a display 412, external and internal memories (not shown), and other computer components as is known in the art.

As described above, FIG. 4 is a schematic illustration of the multiplication of two 4 bit binary numbers. The multiplication is performed in a way similar to multiplication by hand with pencil and paper. The 4 bit multiplicand 38 is multiplied with the four bit multiplier 39 by first multiplying the rightmost bit of multiplier 39 with each of the four bits of multiplicand 38. Partial product 41 is thus generated.

Partial products 43, 45, and 47 are similarly generated by multiplying the second higher bit of the multiplier 39 with each of the four bits of multiplicand 38, multiplying the third higher bit of the multiplier 39 with each of the four bits of multiplicand 38, and multiplying the highest bit of the multiplier 39 with each of the four bits of multiplicand 38. Each of the four partial products, 41, 43, 45, and 47 are shifted left one level of significance, as is done with multiplication by hand. The shaded "dots" such as the dot at 37 represent sign extensions of the binary 2's complement partial products. It is noted that the number of bit positions of the final result 49 is eight. Also, the leftmost bit position of the final result 49, shown at 51, is in a "carry column" 53, which is analogous to column 15 in FIG. 1. Carry column 53 allows for any "carries" from the addition of the four partial products 41, 43, 45, and 47.

The present invention relates to the re-configuration of Carry-Save-Adder (CSA) trees. A CSA takes three binary inputs, adds them, and produces two binary outputs which are a sum and a carry. Thus a CSA may reduce the addition of three binary numbers to the addition of only two. Just as three binary numbers can be summed into two, a CSA tree can sum several numbers to generate two.

Figure 4:
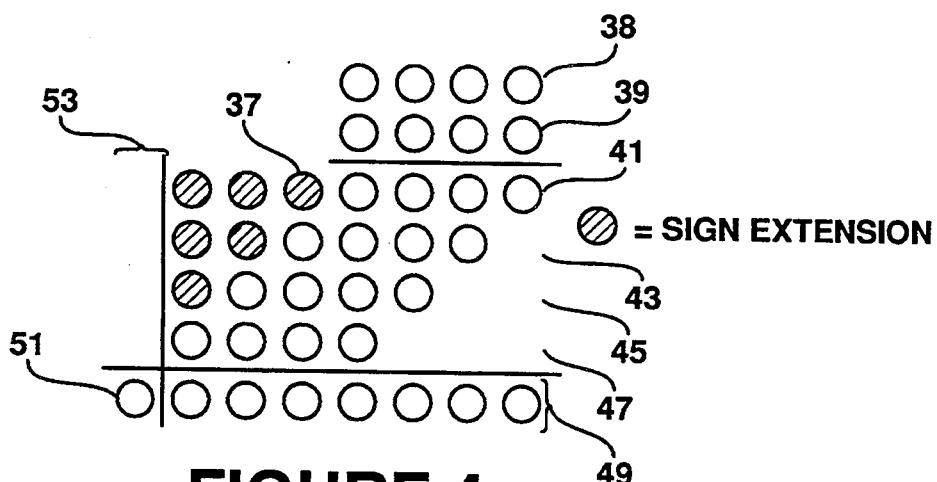
FIG. 4 is a schematic mathematical diagram showing the representative bit positions of a multiplication operation between two 2's complement four bit numbers.
Figure 5:
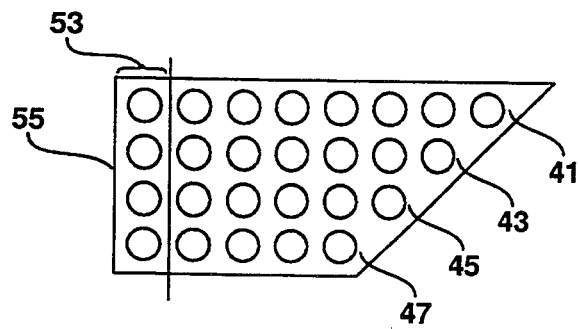
FIG. 5 is a Carry-Save-Adder (CSA) tree for the schematic of FIG. 4.

The CSA tree 55 illustrated in FIG. 5 represents the schematic of FIG. 4. The four partial products 41, 43, 45, and 47 are input directly into their corresponding positions in the CSA tree 55. It is noted that the carry column 53 initially receives no input. Thus, a first partial product 41 equal to "1111110" would be input into the corresponding first partial product position 41 of CSA tree 55 exactly as "1111110." Accordingly, the CSA tree 55 accepts twenty-two binary inputs.

Figure 6:
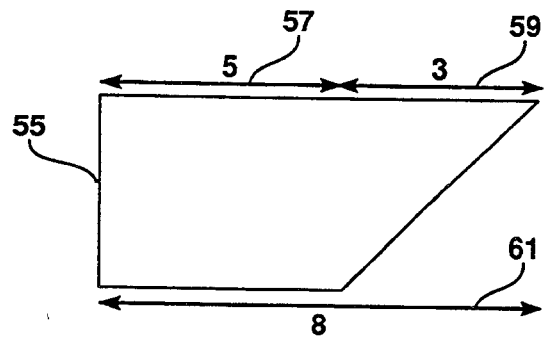
FIG. 6 is an alternative representation of the CSA tree of FIG. 5.

The same CSA tree 55 is represented in FIG. 6 in an alternative format. The top two arrows 57 and 59 indicate that the number of bit positions along the top row is eight, as is also indicated by the bottom arrow 61. It is also evident from FIG. 6 that the bottom row is five bits in length. This representation, because it does not use dots, allows for schematic representations of large CSA trees.

Figure 7:
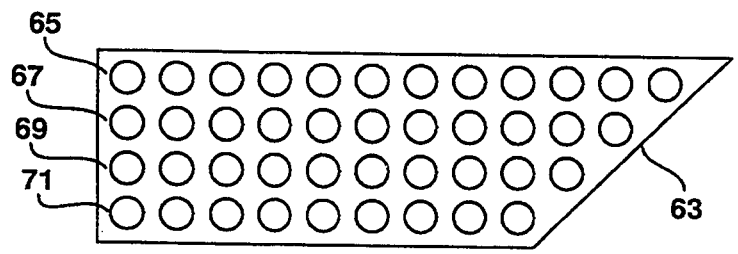
FIG. 7 a CSA tree for a multiplication operation between a 2's complement four bit number and a 2's complement eight bit number.
Figure 8:
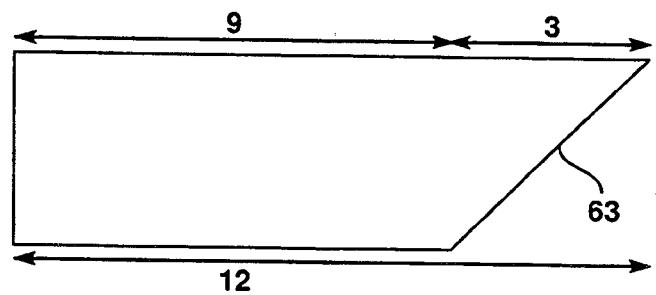
FIG. 8 is an alternative representation of the CSA tree of FIG. 7.

While the CSA tree of FIG. 6 is configured to perform partial product reduction of the partial products generated from multiplication of two four bit operands, the CSA tree of FIGS. 7 and 8 is configured to perform partial product reduction of the partial products generated from multiplication of an eight bit multiplicand and a four bit multiplier. The CSA tree 63 still has only four partial product inputs, which are shown as 65, 67, 69, and 71, because of the four bit multiplier. The partial product inputs, however, have different bit lengths because of the eight bit multiplicand. Each bit of the multiplier is multiplied with all of the bits of the multiplicand to form each partial product.

Figure 9A:
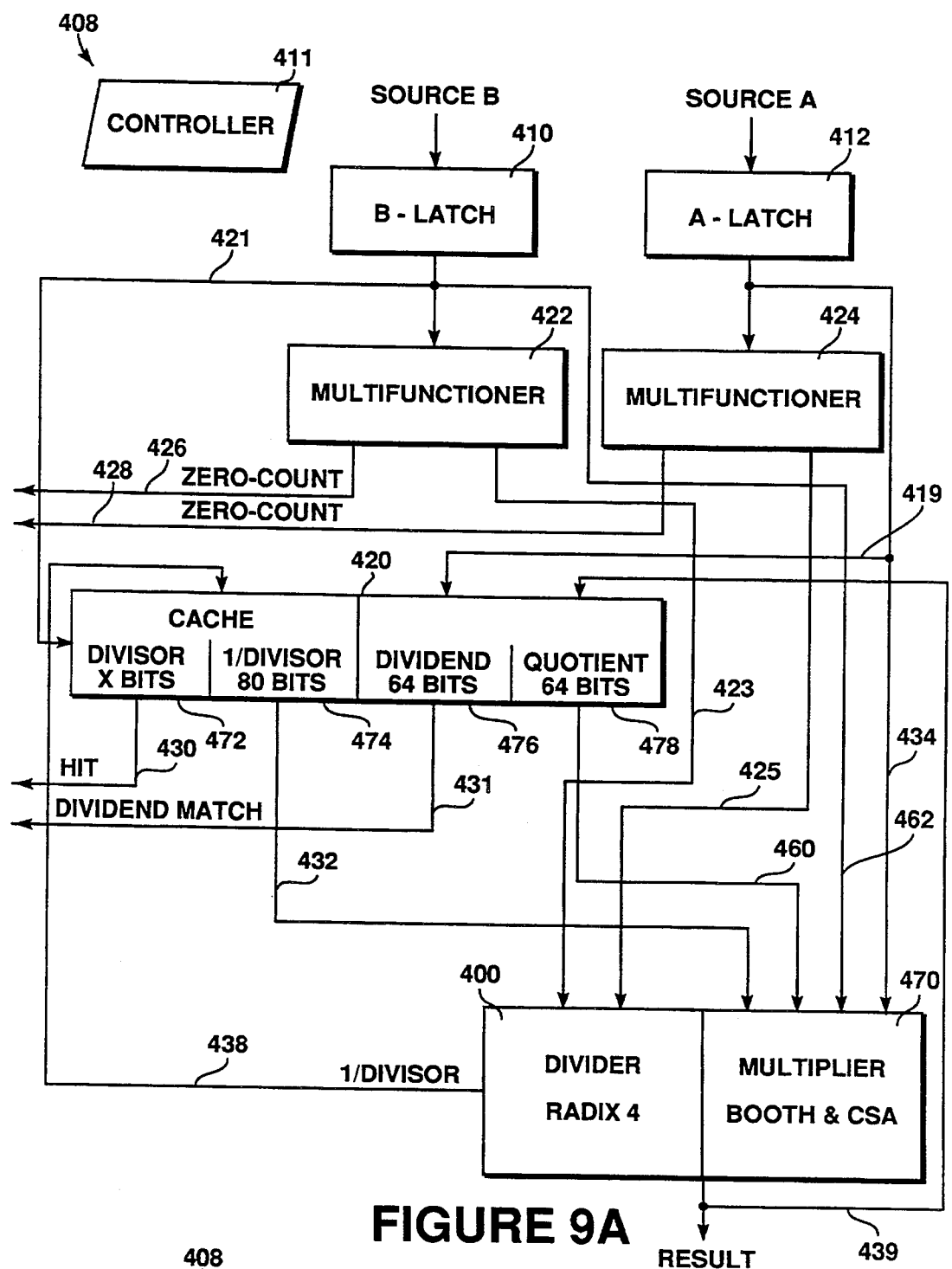
FIGS. 9A and 9B are a block diagram of the overall system architecture which shows how the multiplier is connected to other elements of the system.
Figure 9B:
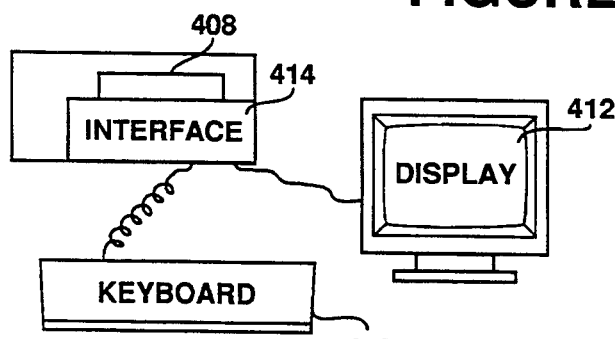

Turning to FIGS. 9A and 9B, the execution unit 408 of the presently preferred embodiment will now be described. The two latches depicted at 410 and 412 are known in the art and are common in execution units such as the presently described unit. Each of the two latches receives and holds an operand.

The operand from b-latch 410 is fed to multi-functioner 422, which comprises a normalizer, a shift register, and a zero-counter. As is known in the art, the normalizer and shift register prepare the operand for division operations by divider 400. Multi-functioner 422 also comprises a zeros-counter, which, as is known in the art, counts any leading zeros in the operand, thus preparing the operand for multiplication by multiplier 470.

Similarly to multi-functioner 422, multi-functioner 424 accepts the operand from a-latch 412. Multi-functioner 424 comprises a shift register and a zeros-counter, which prepare the operand for divider 400 and multiplier 470, respectively. In the case of regular multiplication operations wherein the execution unit 408 operates as a standard multiplier, the zero-counters of multi-functioners 422 and 424 send zero-counts to a controller 411 via lines 426 and 428, respectively. Accordingly, multi-functioners 422 and 424 are configured to prepare operands for either division operations by divider 400 or for multiplication operations by multiplier 470.

Each row of the cache memory 420 of the presently preferred embodiment comprises storage for a divisor field 472 which is an address field, a reciprocal field 474, a dividend field 476, and a quotient field 478. In the case of division, the operand from b-latch 410 is the divisor. The divisor is fed to the cache memory 420 via line 421, where the cache memory 420 compares the divisor with the rows of the divisor field 472. If a value representing the value of the divisor is found in the divisor field 472, a "hit" message is sent to the controller 411 via line 430.

Upon a "hit," the value of the reciprocal of the divisor is then retrieved from a row in the reciprocal field 474 which is on the same row of the cache memory 420 that the divisor was found. The reciprocal is then fed to multiplier 470 via line 432. The multiplier 470 receives the reciprocal of the divisor via line 432, receives the dividend via line 434, and multiplies the two, in effect yielding the quotient of the dividend and the divisor. Accordingly, in the case of division and in the event of a "hit," the reciprocal of the divisor is read from the cache memory 420 instead of being calculated, thus saving valuable computer resources in the division operation.

In the event that a value representing the value of the divisor is not found in the divisor field 472 of the cache memory 420, division is performed by divider 400 as follows. Divider 400 receives as input the shifted and normalized operand (the divisor) from multi-functioner 422 via line 423, and receives as input the shifted operand (the dividend) from multi-functioner 424 via line 425. In dividing the dividend by the divisor, as is known in the art, the divider 400 computes the reciprocal of the divisor. The divider 400 places the reciprocal of the divisor on line 438 for placement into the reciprocal field 474 of the cache memory 420. The divisor is also placed in the divisor field 472 on the same row of the cache memory 420 as the reciprocal.

In the case of a simple multiply operation, the two operands from b-latch 410 and a-latch 412 may simply be input into multiplier 470 and multiplied. The multiplier 470 and divider 400 share a series of registers, CSAs, and adders, thus minimizing the amount of hardware used by the two.

In the case of integer arithmetic (as opposed to floating point which the above description has been directed), division operations may be performed and remainder operations (i.e., finding the remainder from an integer division operation) may subsequently be performed independent of any of the corresponding division operations. Remainder operations are especially prominent in situations where several processors work together in a parallel fashion, an environment envisioned by the applicant of the present invention. In performing matrix operations in a parallel computing environment, for example, integer-quotient operations and remainder operations are performed frequently and independently of each other.

Regarding integer arithmetic, the execution unit 408 the relationship that for a given dividend and divisor, the quotient may be expressed in the form of an integer and a remainder. In such a case, the remainder can be determined from subtracting from the dividend the product of the integer quotient and the divisor.

Accordingly, the execution unit 408, when operating in integer arithmetic, places each integer quotient result on line 439 in addition to placing each reciprocal on line 438. As before, the divisor and the reciprocal are stored in a row of the cache memory 420. Additionally, the integer quotient on line 439 is stored in the quotient field 478 of the cache memory 420 on the same row as the divisor and the reciprocal. Moreover, the operand from the a-latch 412 is placed into the dividend field 476 on the same row of the cache memory 420 via line 419.

A resulting 4-element row of the cache memory 420 is thereby formed with each unique integer division operation. A remainder operation can be performed by first comparing the divisor from b-latch 410 with the rows of the divisor field 472 of cache memory 420. In the event of a "hit," the "hit" message is sent to the controller 411 via line 430. Secondly, the dividend field 476 on the same row that the divisor "hit" occurred is compared with the dividend from the a-latch 412. In the event of a match, a "dividend match" message is sent to the controller 411 via line 431.

The value of the quotient field 478 is then fed to multiplier 470 via line 460, and the divisor and dividend are fed from b-latch 410 and a-latch 412 to multiplier 470 via lines 462 and 434, respectively. Alternatively, the values of the divisor field 472 and the dividend field 476 may be fed from the cache memory 420 to the multiplier 470 via two additional lines, according to preference. With the four inputs, the multiplier 470 can compute the remainder without having to divide or compute a reciprocal. Further details of the execution unit 408 are disclosed in U.S. patent application Ser. No. 07/970,260, filed Nov. 2, 1992, Jehoshua S. Rotstain entitled "Method and Apparatus for Using A Cache Memory to Store and Retrieve Intermediate and Final Results." The above-referenced patent application has been assigned to the assignee of the present invention, and the contents of the application are hereby referred to and incorporated by reference.

Figure 10A:
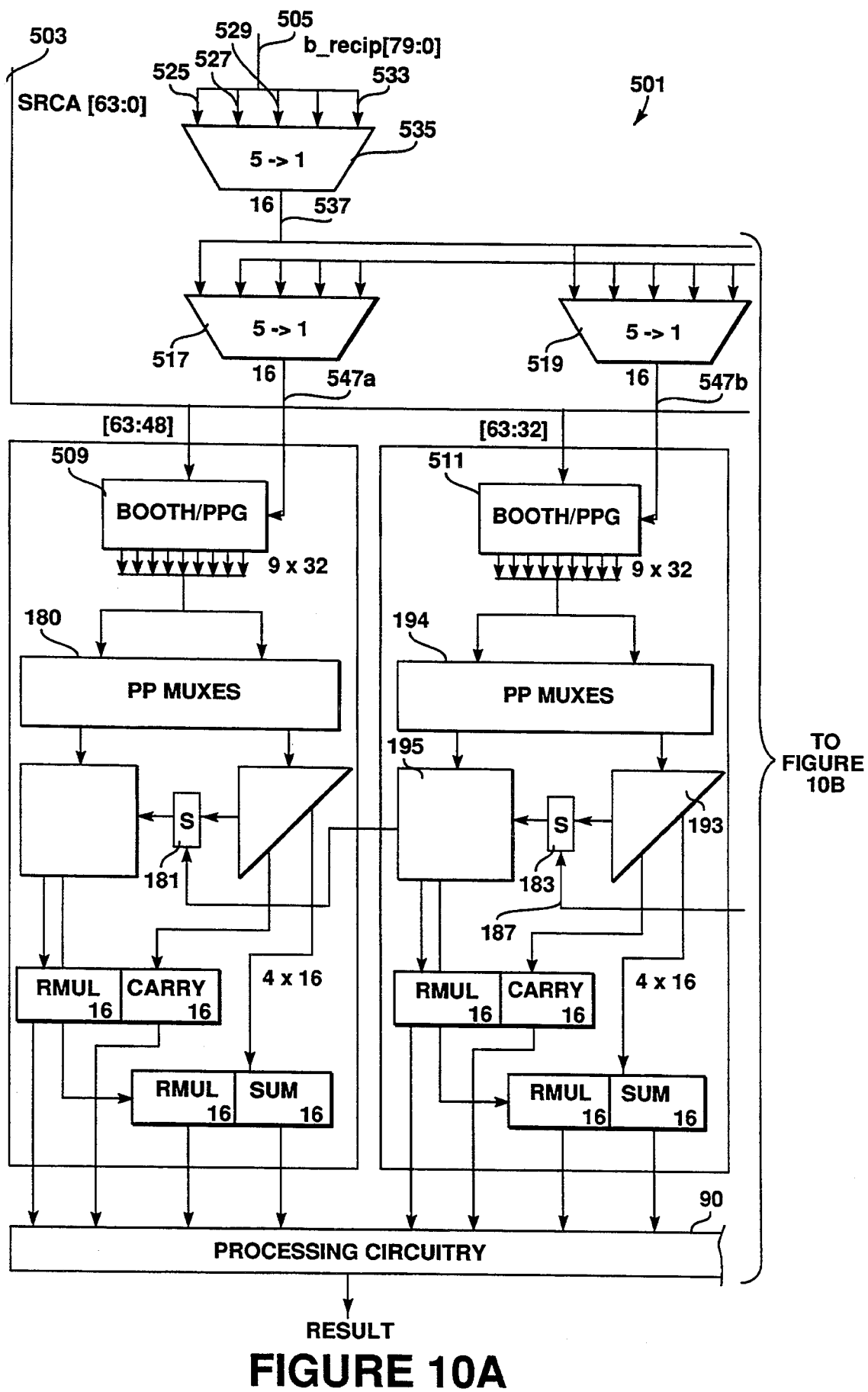
FIGS. 10A and 10B are a block diagram which shows multiplier circuitry that is interior to the multiplier.
Figure 10B:
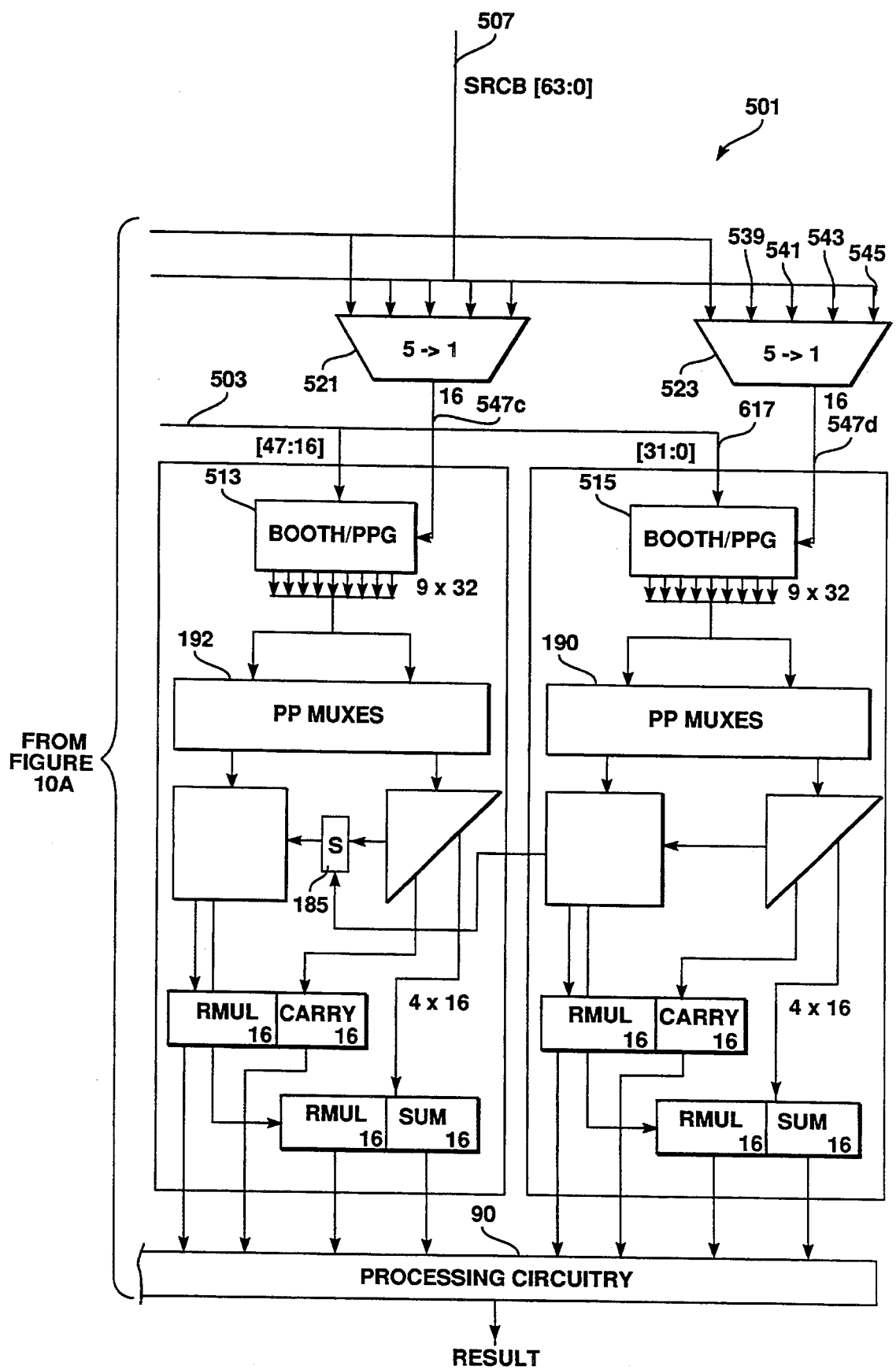

FIGS. 10A and 10B show multiplier circuitry 501 which is interior to the multiplier 470 of FIG. 9A. In the presently preferred embodiment, the multiplier circuitry 501 can receive as a first operand a sixty-four bit binary number on line 503. The binary number is input into the multiplier 470 of FIG. 9 via line 434. Line 505 of the multiplier circuitry 501 holds an eighty bit number, which is input into the multiplier 470 of FIG. 9 via line 432. Line 507 of the multiplier circuitry 501 holds a sixty-four bit number, which is input into the multiplier 470 of FIG. 9 via either one of lines 460 and 462.

The data on line 505 is split into five lines, each line being sixteen bits in length such that line 525 holds the sixteen bits of highest significance, line 527 holds the sixteen bits of second highest significance, line 529 holds the sixteen bits of third highest significance, line 531 holds the sixteen bits of fourth highest significance, and line 533 holds the sixteen bits of lowest significance. The five-to-one multiplexer 535 chooses the value of one of the five lines to place on the sixteen bit line 537.

Similarly, four five-to-one multiplexers 517, 519, 521, and 523 accept data from lines 507 and 537. Each of the four multiplexers passes a sixteen bit value at any given time. Taking multiplexer 523 for example, each of the four lines stemming from line 507 labeled as 539, 541, 543, and 545 are sixteen bits in length. Multiplexer 523 chooses between the four lines and line 537, placing the value of the chosen line on sixteen bit line 547d. The output lines of the other three multiplexers 517, 519, and 521 are labeled 547a, 547b, and 547c, respectively.

The sixty-four bit number on line 503 is input into each of the four Booth decoder/partial product generators (Booth/PPGs) 509, 511, 513, and 515, such that the sixteen bits of highest significance are available to Booth/PPG 509, the thirty-two bits of highest significance are available to Booth/PPG 511, the thirty-two bits of intermediate significance (e.g., bit numbers sixteen to forty-seven) are available to Booth/PPG 513, and the thirty-two bits of lowest significance are available to Booth/PPG 515.

The Booth/PPGs 509, 511, 513, and 515 also accept as input the sixteen bit outputs from the four five-to-one multiplexers 517, 519, 521, and 523. Each of the four Booth/PPGs properly handles 2's complement signed numbers. In addition, the present invention, can handle unsigned numbers. Upon an instruction to handle an unsigned operand (not 2's complement), the operand is converted into a signed number by adding zeros to the most significant bit of the operand. The operand is consequently converted into an eighteen bit format. Although a sixteen bit number generates eight partial products under two bit Booth's decoding, the eighteen bit format generates an additional ninth partial product. For signed numbers, on the other hand, the eighteen bit format is still used, but the added bits are a sign extension of the most significant bit rather than zeros.

Figure 11:
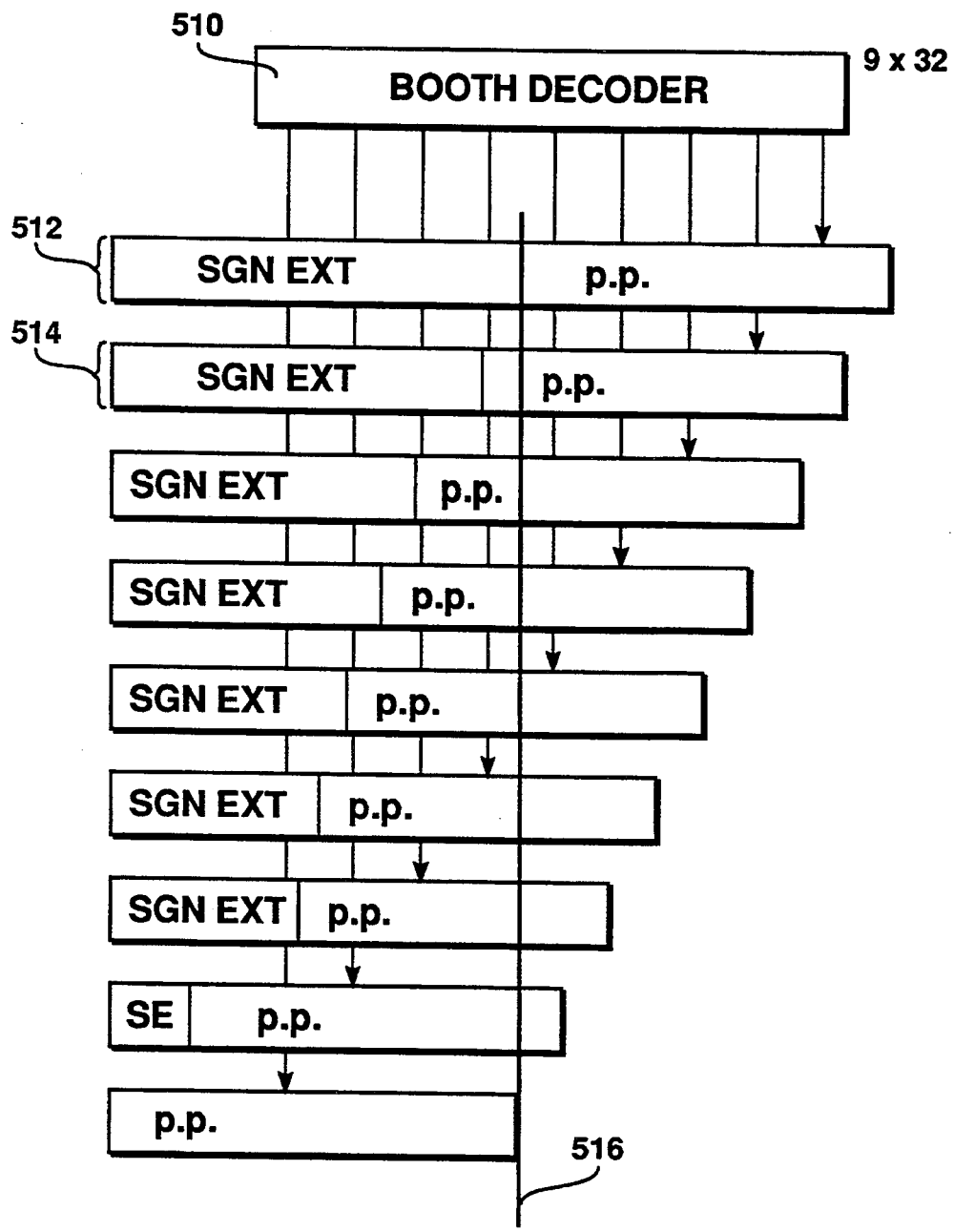
FIG. 11 is a schematic diagram showing a Booth decoder and the nine partial products generated therefrom.

Within each of the four Booth/PPGs 509, 511, 513, and 515 is a Booth decoder. FIG. 11 depicts an exemplary one of the Booth decoders 510 which is used in the presently preferred embodiment. The Booth decoder 510 is known in the art as a 16+2 bit multiplier, which uses 2 bit Booth's decoding to generate nine partial products. It is noted that, without a partial product reduction scheme like Booths decoding, the expected number of partial products to be generated from two sixteen bit operands in a multiply operation is sixteen. Each of the Booth decoders, however, is able to generate nine partial products instead of the expected sixteen partial products.

The first partial product 512 is thirty-two bits long. The least significant bits of the first partial product 512 are derived from the multiplicand, and the sixteen most significant bits are a sign extension. The second partial product 514 is thirty bits long, with the sixteen least significant bits being derived from the multiplicand and the remaining bits being a sign extension. The other seven partial products are generated in a similar manner. Since each partial product is shifted left two bit positions, the final partial product is only sixteen bits long, with no explicit sign extension.

In the presently preferred embodiment, the full sign extensions are generated and summed. Although, there are ways to minimize or eliminate the sign extension, the circuitry of the presently preferred embodiment which implements the sign extension allows for efficient reconfiguration of each Booth/PPG from a sixteen by sixteen bit multiplication configuration to a sixteen by sixty-four bit multiplication configuration.

The gray perpendicular line 516 indicates the boundary between the "full" and "sparse" portions of the pattern of nine partial products. The "full" portion of the partial products and the CSA tree for summing them is referred to as a rectangular portion. The "sparse" portion contains the lower significance bits, and contains fewer than nine partial products. These partial products and the CSA tree for summing them is referred to as a triangular portion. It is at the boundary between the square and rectangular portions of the CSA tree that switches (multiplexers) are located to switch the CSA array from a Quad sixteen by sixteen bit multiply configuration to a sixty-four by sixteen bit multiply configuration.

Looking at the above-mentioned input lines 503, 505, and 507, one can discern that the multiplier circuitry is adopted for performing any of the following three multiply operations. The first multiply operation relies on a Quad sixteen by sixteen bit multiply configuration, and the second and third multiply operations rely on a sixty-four bit by sixteen bit multiply configuration.

1. FOUR SIXTEEN BIT BY SIXTEEN BIT MULTIPLICATIONS

The multiplicand is input on line 503 shown in FIG. 10 with a different sixteen bits of the multiplicand going into each Booth/PPG. The multiplier is input on lines 547a–d with a different sixteen bits of the multiplier being on each of the lines for the single multiply cycle. The controller 411 of FIG. 9A controls the multiplexers 517, 519, 521, and 523, thus determining which sixteen bit portion is placed on each of the lines 547a–d.

Figure 12:
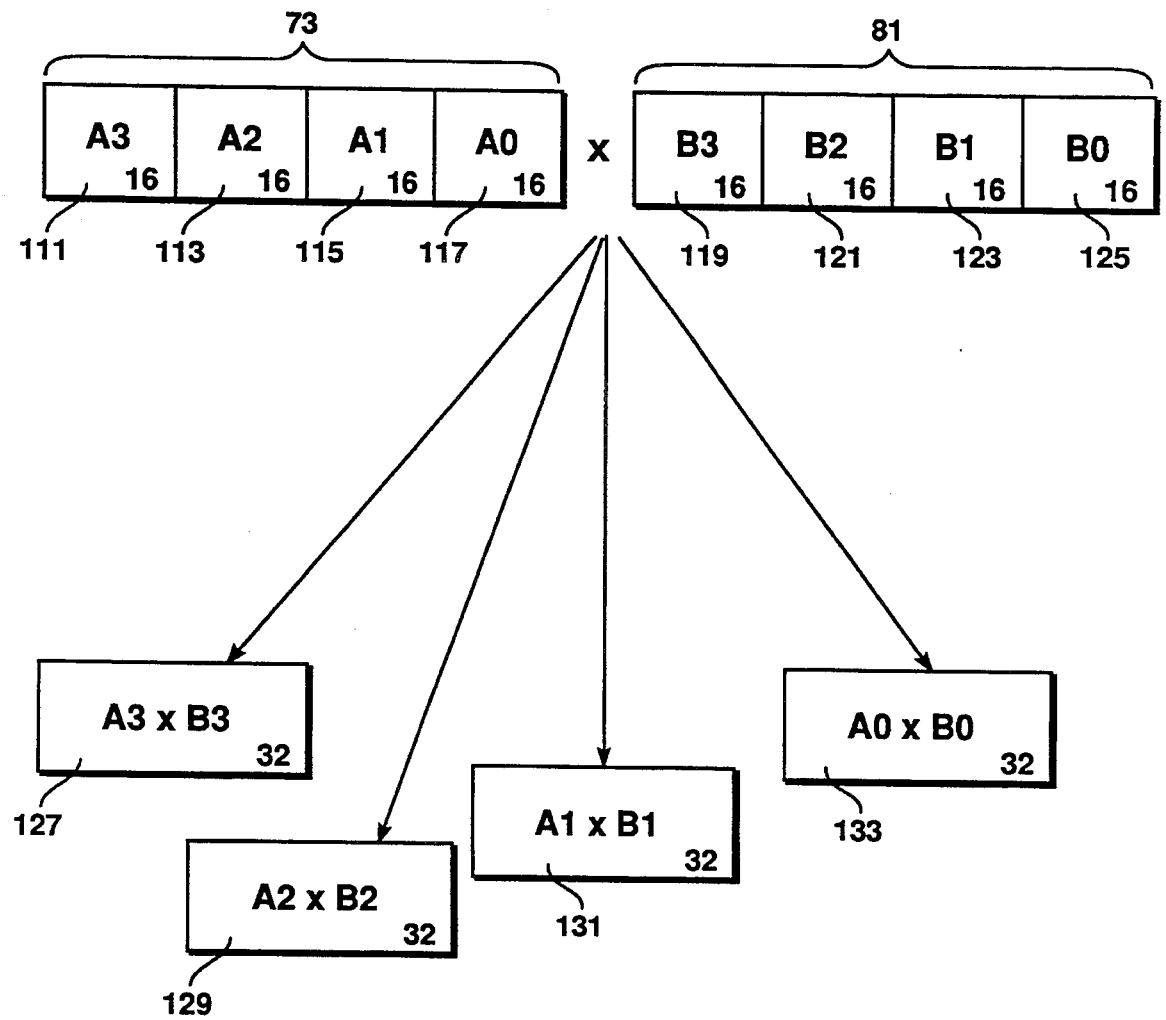
FIG. 12 is a schematic diagram showing a multiplication of four sixteen bit numbers according to the presently preferred embodiment.

FIG. 12 shows the four sixteen bit by sixteen bit multiplications. To begin, each of the four sixteen bit sections of the sixty-four bit multiplicand 73, labeled 111, 113, 115, and 117, is input into a different one of the four Booth/PPGs 509, 511, 513, and 515. Also, each of the four sixteen bit sections of the sixty-four bit multiplier 81, labeled 119, 121, 123, and 125, is input into a different one of the four Booth/PPGs 509, 511, 513, and 515 via lines 547a–d. The multiplication yields four thirty-two bit intermediate results in a single multiplication cycle.

Looking at the four Booth/PPGs 509, 511, 513, and 515 of FIG. 10, each Booth/PPG receives two sixteen bit inputs and generates nine partial products. The reduction of these nine bit partial products to intermediate results is the subject of the present invention. The "rectangles" and "triangles" beneath the Booth/PPGs, such as rectangle 195 and triangle 193, represent CSA trees. The functionality of CSA trees and the schematic representation thereof is described above with reference to FIGS. 5–8.

Figure 13:
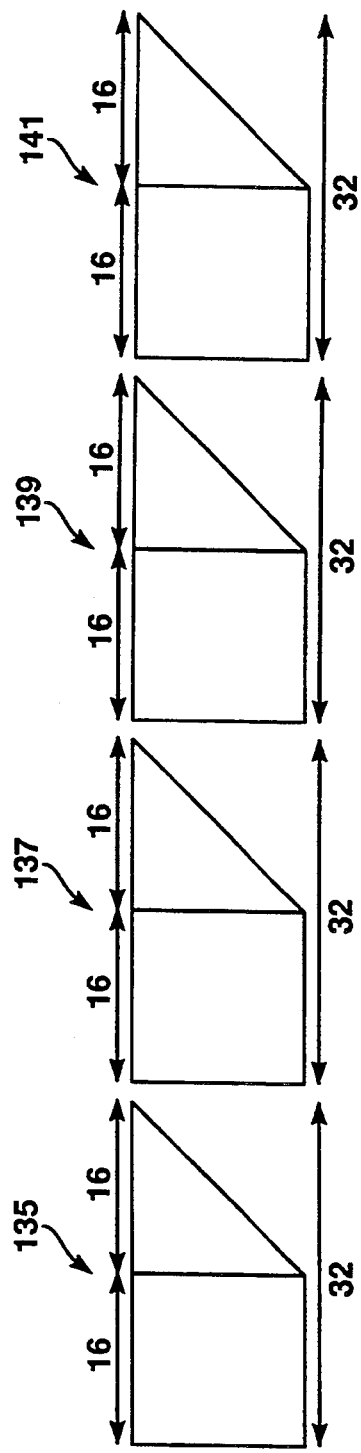
FIG. 13 is a block diagram showing the presently preferred configuration of CSA trees for a sixteen bit by sixteen bit multiplication.

FIG. 13 shows the presently preferred configuration of the CSA trees for the multiplier circuitry 501 for the sixteen bit by sixteen bit multiplication. The rectangle and triangle 135 of FIG. 13 represent the CSA tree that receives data from Booth/PPG 509. Booth/PPG 509 generates nine partial products for the multiplicand section 111 and the multiplier section 119 shown in FIG. 12. The rectangle and triangle 141 of FIG. 13 represent the CSA tree that receives data from Booth/PPG 515. Booth/PPG 515 generates nine partial products for the multiplicand section 117 and the multiplier section 125 shown in FIG. 12. It follows that, for the sixteen bit by sixteen bit multiplication configuration, each of the four CSA tree representations 135, 137, 139, and 141 accepts nine partial products from a corresponding one of the Booth/PPGs 509, 511, 513, and 515, and generates data corresponding to one of the intermediate results 127, 129, 131, and 133.

Figure 15A:
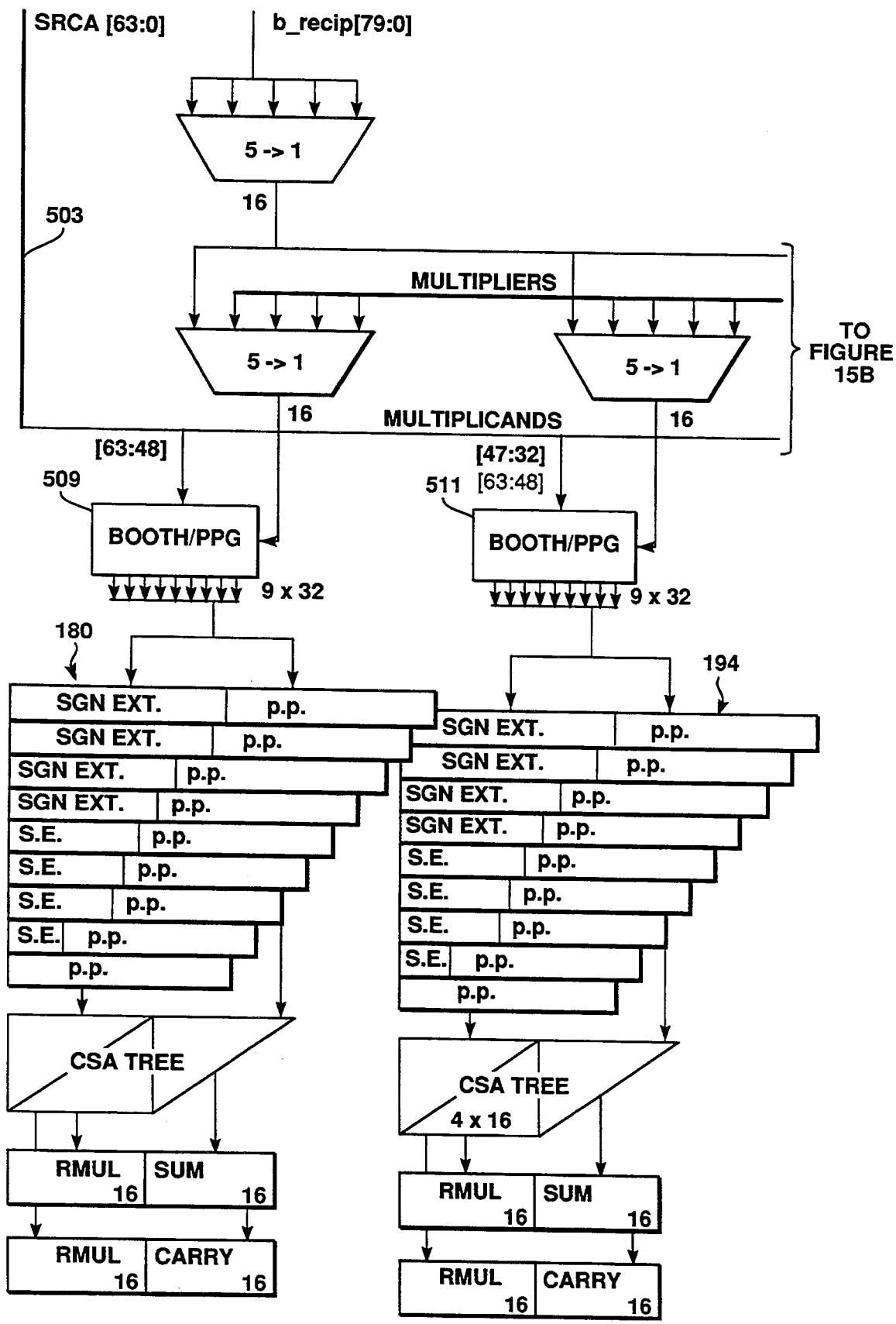
FIGS. 15A and 15B are a block diagram showing multiplier circuitry that is interior to the multiplier.
Figure 15B:
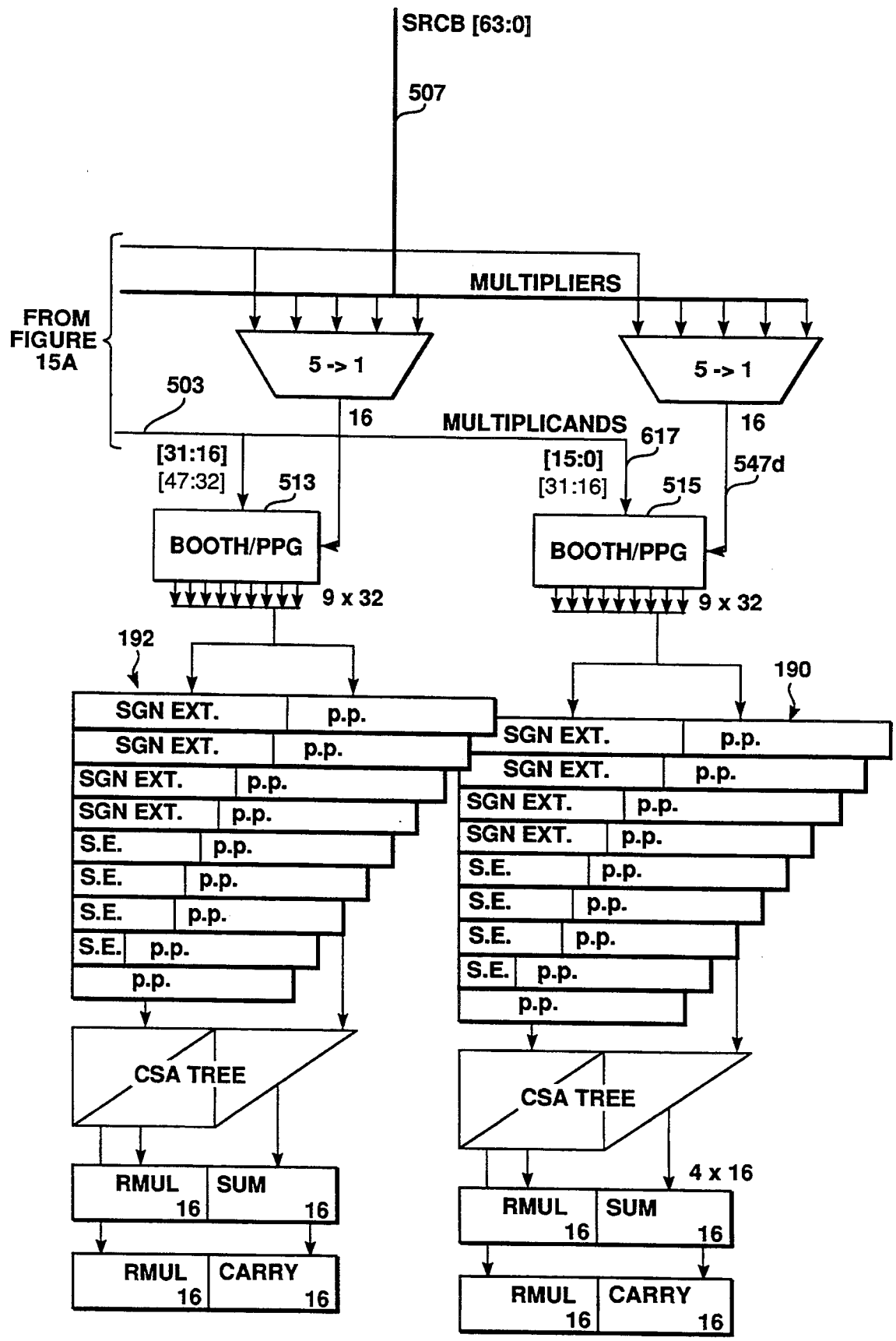

FIGS. 15A, 15B, 16A and 16B show the particulars of the multiplier circuitry 501 of FIG. 10 for the sixteen bit by sixteen bit multiply configuration. Bold lines show the direction of signal flow in this configuration. The sixteen lowest bits (bit numbers zero to fifteen) are input into Booth/PPG 515 from line 503, and the sixteen highest bits (bit numbers forty-eight to sixty three) are input into Booth/PPG 509 from line 503. In FIG. 15A and 15B, the line going into Booth/PPG 515, for example, has the bold characters "[15:0]" which indicate the bits that the Booth/PPG 515 accepts as input. The un-bolded characters "[31:16]" directly below indicate that bits sixteen to thirty-one are available to Booth/PPG 515 but are not accepted in this configuration. (The Booth/PPG 515 configuration of FIG. 23, however r, uses all thirty-two bits on the line as input.) Booth/PPGs 511 and 513 receive inputs in a similar way to Booth/PPGs 509 and 515.

Figure 16A:
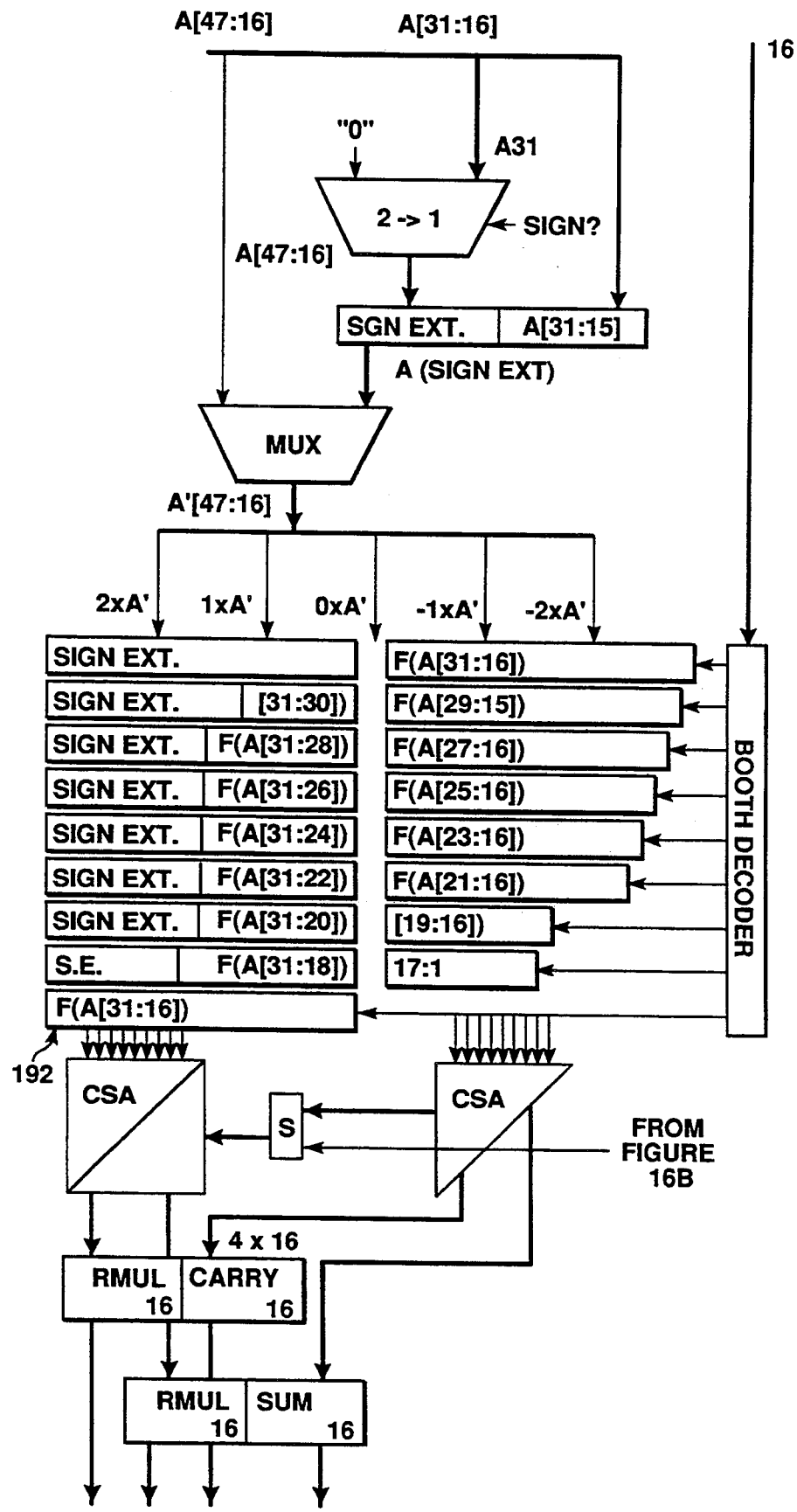
FIG. 16A and 16B are a block diagram showing two of the four Booth/PPGs according to the presently preferred embodiment.
Figure 16B:
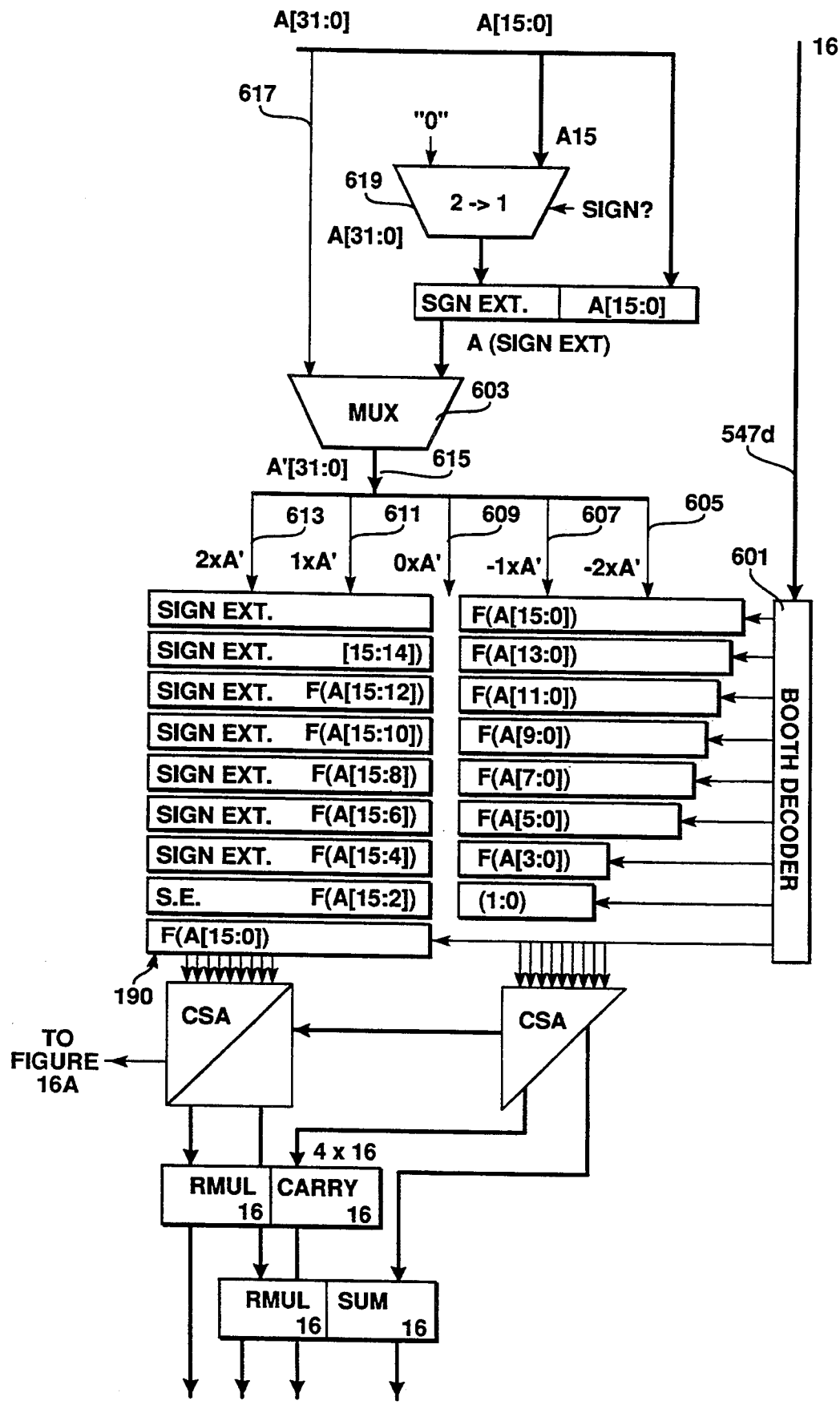

Of the four partial product multiplexers 180, 194, 192, and 190 shown in FIGS. 15A and 15B, partial product multiplexers 192 and 190 are shown in FIG. 16A and 16B. Also the two Booth/PPGs 515 and 513 are shown in detail in FIG. 16. Booth/PPG 515, for instance, comprises partial product generating circuitry and a Booth decoder 601. As is known in the art, the partial product generating circuitry of Booth/PPG 515 inputs the lowest sixteen bits from line 617. The controller 411 instructs the two-to-one multiplexer 619 as to whether the multiplicand is in 2's compliment form or regular form. A corresponding sign extension of zeros or ones is added to the sixteen bits to make the sixteen bits a thirty-two bit number. The thirty-two bit number is fed into multiplexer 603 and output on line 615, As is known in the art, the Booth decoder 601 operates on the theory that instead of multiplying each single bit of the multiplier with the entire multiplicand to generate a number of partial products equal to the number of bits in the multiplier, each of bits of the multiplier can be multiplied with the multiplicand to generally yield half as many partial products.

For reasons known in the art, the Booth decoder 601 is able to generate each partial product as a multiple of the multiplicand. Accordingly, each of the five lines 605, 607, 609, 611, and 613 hold a multiple of the multiplicand that is output on line 615 from multiplexer 603. That is, lines 605, 607, 609, 611, and 613 hold negative two times, negative one times, zero times, one times, and two times the multiplicand on line 615, respectively. Booth decoder 601 receives as input on line 547d the sixteen bit portion of the multiplier and selects from the different values on lines 605, 607, 609, 611, and 613 the values to be output as partial products. As shown in FIG. 16A and 16B, each partial product is shifted two bit positions.

Looking now at the partial product multiplexers 190, each multiplexer is simply instructed by the Booth decoder 601 to choose an appropriate value from lines 605, 607, 609, 611, and 613 and to place that shifted value into the CSA tree. Thus, each of the nine multiplexers 190 inputs one of the values, shifted, on lines 605, 607, 609, 611, and 613 as a partial product into the CSA tree beneath.

2. SIXTY-FOUR BIT BY SIXTEEN BIT MULTIPLICATION

A) SIXTY-FOUR BIT BY SIXTY-FOUR BIT MULTIPLICATION

As shown in FIGS. 10A and 10B, the multiplicand is input on line 503 with a different sixteen bits of the multiplicand going into each Booth/PPG. The multiplier is input on lines 547a-d with the same sixteen bit portion being on each of lines 547a-d (relative to the other lines) for any given one of four multiply cycles. The controller 411 of FIG. 9 controls the multiplexers 517, 519, 521, and 523, thus determining which sixteen bit portion is placed on each of the lines 547a-d. With each multiply cycle, however, a different sixteen bit portion of the multiplier is put on lines 547a-d, while the multiplicand input into the four Booth/PPGs remains the same.

Figure 17:
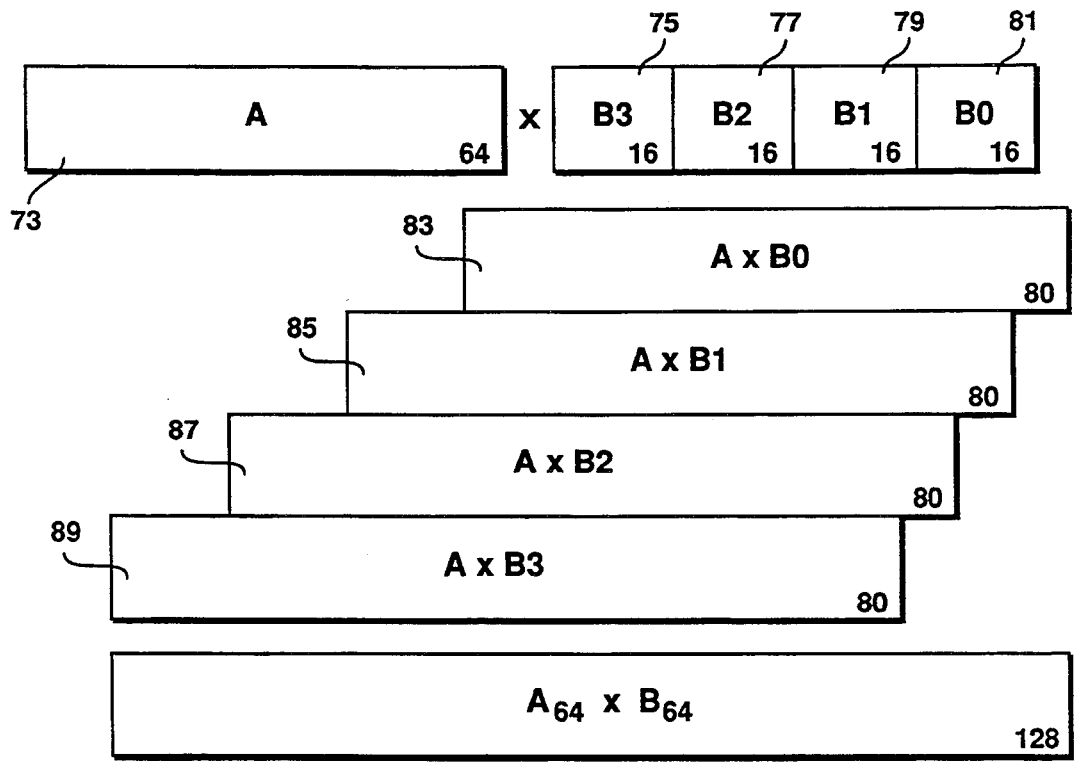
FIG. 17 is a schematic diagram showing a multiplication of two sixty-four bit numbers according to the presently preferred embodiment.

FIG. 17 shows the sixty-four bit by sixty-four bit multiplication. The sixty-four bit multiplicand 73 is multiplied with each of the four sixteen bit multiplier sections 81, 79, 77, and 75 for a total of four multiply cycles and a total of four eighty bit intermediate results 83, 85, 87, and 89. Thus, for example, the first multiply cycle places the sixteen bits of lowest significance 81 of the multiplier on each of lines 547a, 547b, 547c, and 547d, and multiplies this sixteen bit section 81 with the sixty-four bit section 73. The eighty bit intermediate result 83 is yielded. The multiply cycle is repeated three more times with sixteen bit sections 79, 77, and 75, each of the sections being multiplied with the sixty-four bit multiplicand 73, thus yielding eighty bit intermediate results 85, 87, and 89, respectively. The four intermediate results 83, 85, 87, and 89 are processed and summed in processing circuitry 90.

B) SIXTY-FOUR BIT BY EIGHTY BIT MULTIPLICATION:

Although the sixty-four bit by sixty-four bit multiplication is generally a standard multiplication operation, the sixty-four bit by eighty bit multiplication is especially useful for the reciprocal operation which was discussed above with reference to FIG. 9. In this operation, the multiplicand is input on line 503 of FIG. 10 with a different sixteen bits of the multiplicand going into each Booth/PPG. The multiplier (reciprocal from line 505) is input on lines 547a-d with the same sixteen bit portion being on each of lines 547a-d (relative to the other lines) for any given one of five multiply cycles. The controller 411 of FIG. 9 controls the multiplexers 535, 517, 519, 521, and 523, thus determining which sixteen bit portion is placed on each of the lines 547a-d. With each multiply cycle, however, a different sixteen bit portion of the multiplier is put on lines 547a-d, while the multiplicand input into the four Booth/PPGs remains the same.

Figure 18:
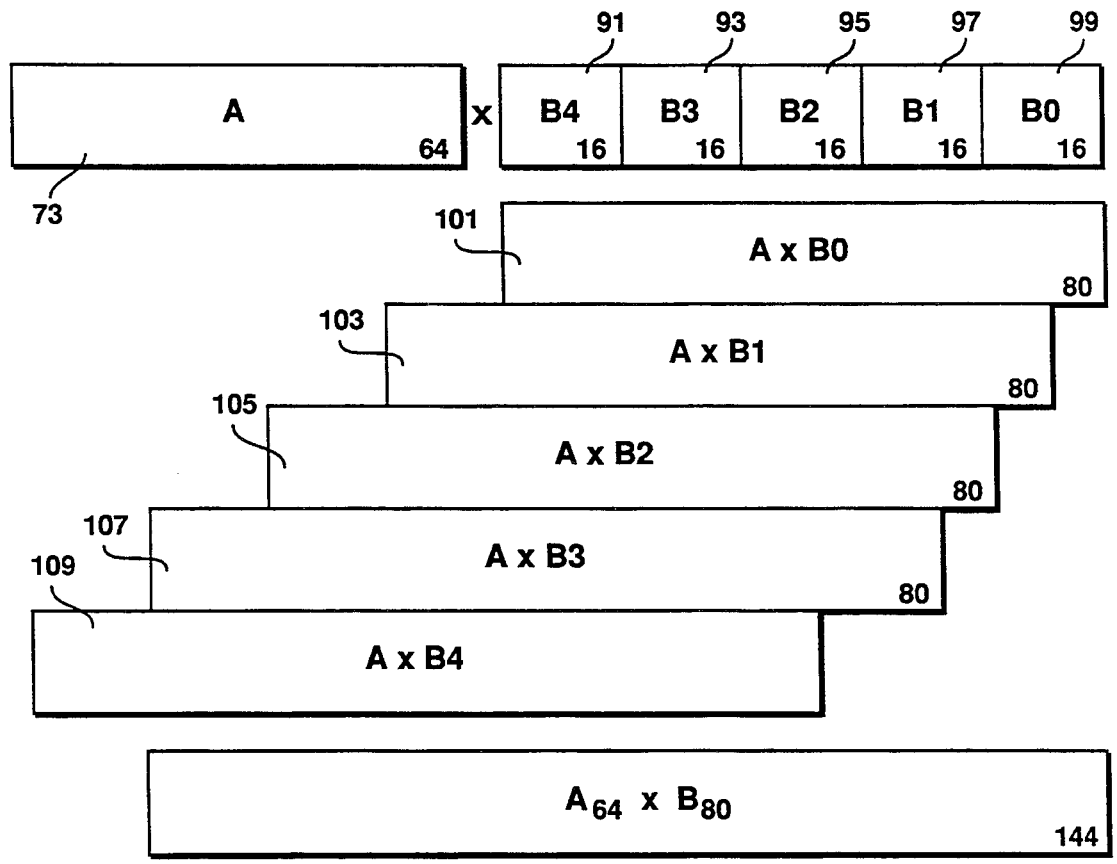
FIG. 18 a schematic diagram showing a multiplication of a sixty-four bit number and an eighty-bit number according to the presently preferred embodiment.

FIG. 18 shows the sixty-four bit by eighty bit multiplication. The sixty-four bit multiplicand 73 is multiplied with each of the five sixteen bit multiplier sections 99, 97, 95, 93, and 91 for a total of five multiply cycles and a total of five eighty bit intermediate results 101, 103, 105, 107, and 109. Thus for example, the first multiply cycle places the sixteen bits of lowest significance 99 of the multiplier on each of lines 547a, 547b, 547c, and 547d, and multiplies this sixteen bit section 99 with the sixty-four bit section 73. The eighty bit intermediate result 101 is yielded. The multiply cycle is repeated four more times with sixteen bit sections 97, 95, 93, and 91, each of the sections being multiplied with the sixty-four bit multiplicand 73, thus yielding eighty bit intermediate results 103, 105, 107, and 109, respectively. The five intermediate results 101, 103, 105, 107, and 109 are processed and summed in the processing circuitry 90 shown in FIGS. 10A and 10B.

C) GENERAL

Figure 19:
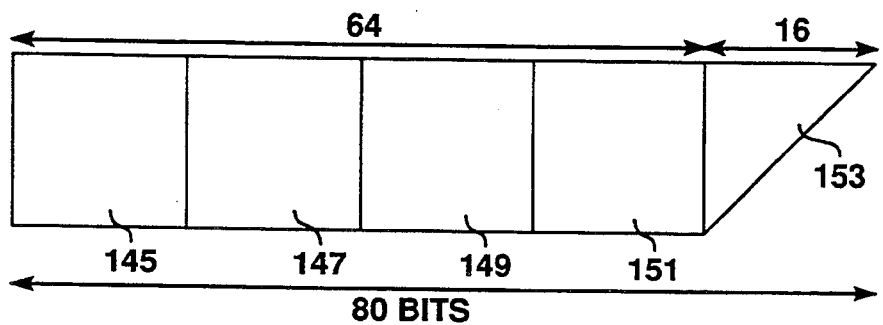
FIG. 19 is a block diagram showing the presently preferred configuration of CSA trees for a sixteen bit by sixty-four or eighty bit multiplication.

FIG. 19 shows the presently preferred configuration of the CSA trees for the multiplier circuitry 501 for either the sixty-four bit by sixty-four bit multiplication or the sixty-four bit by eighty bit multiplication. The rectangle 145 of FIG. 19 corresponds to the rectangle part of the CSA tree representation 135 of FIG. 13. Similarly, rectangles 147, 149, and 151 of FIG. 19 correspond to the rectangle parts of CSA tree representations 137, 139, and 141 of FIG. 13. Triangle 53 of FIG. 19 corresponds to the triangle part of CSA tree 141 of FIG. 13.

It is noted that the configuration of FIG. 13 receives as input four separate sets of nine partial products, while the configuration of FIG. 19 effectively receives as input only one set of nine partial products. That is, the CSA tree configuration of FIG. 19 accepts a set of sixty-four to eighty bit partial products from the four Booth/PPGs, instead of four separate sets of sixteen to thirty-two bit partial products. This transformation of the partial product format in the sixty-four bit by sixty-four bit multiplication and the sixty-four bit by eighty bit multiplication will be discussed below.

Continuing with the description of the CSA tree configurations of FIG. 13 and FIG. 19, it is also noted that the former generates four separate thirty-two bit intermediate results, and the latter generates a single eighty bit intermediate result (for each multiply cycle). In either configuration, however, the intermediate results are eventually reduced into two numbers and then summed in a carry-propagate adder located inside processing circuitry 90, thus yielding the final result of the given multiply operation.

Figure 14:
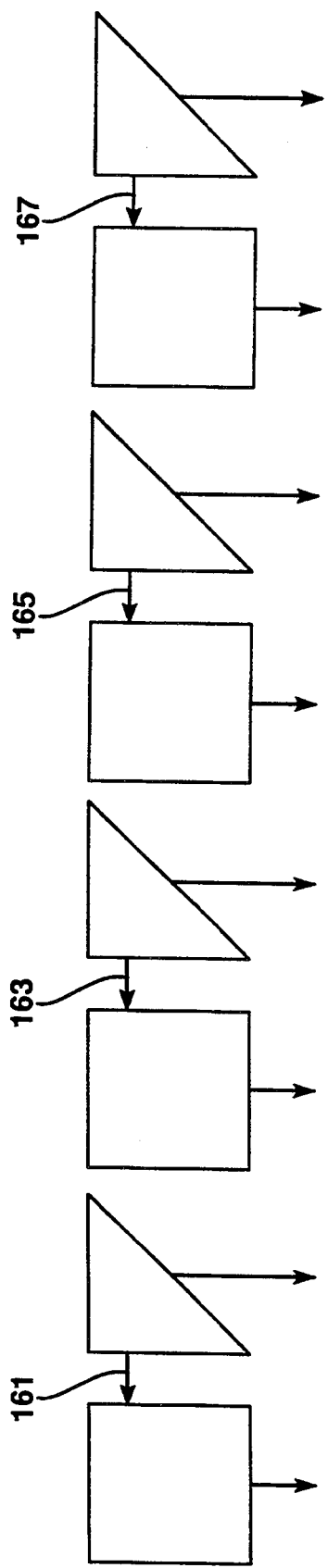
FIG. 14 lock diagram which shows the interconnections between the triangle sections and the rectangle sections of the CSA tree configuration of FIG. 13.
Figure 20:
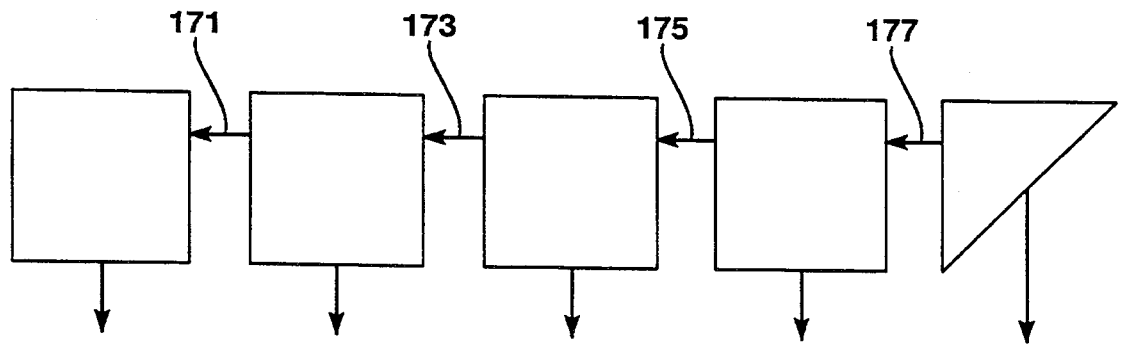
FIG. 20 is a block diagram which shows the interconnections between the triangle sections and the rectangle sections of the CSA tree configuration of FIG. 19.

Regarding the re-configuration of the CSA tree configuration of FIG. 13 to the CSA tree configuration of FIG. 19, or vice-versa, FIG. 14 and FIG. 20 are now discussed. FIG. 14 simply shows the interconnection between the triangle sections and the rectangle sections of the CSA tree configuration of FIG. 13. Similarly, the elements of FIG. 20 correspond to the elements of FIG. 19 wherein each of the arrows 171, 173, 175, and 177 represents an interconnection of the higher significant bit from a previous stage.

Figure 21:
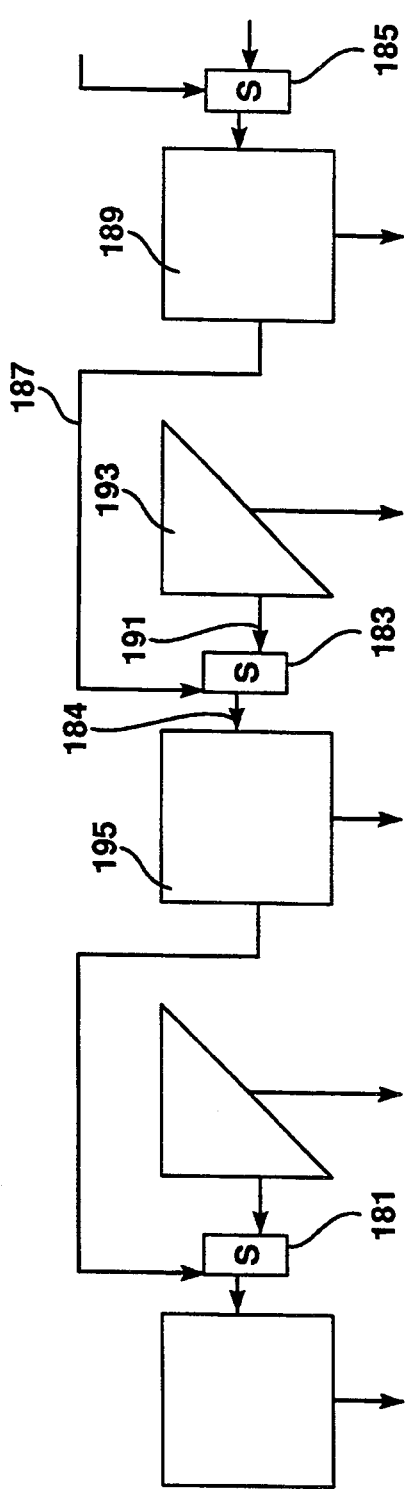
FIG. 21 is a block diagram showing the insertion of switches between the triangle sections and the rectangle sections of a CSA tree configuration according to the presently preferred embodiment.

In order to get from the CSA tree configuration of FIG. 13 to the CSA tree configuration of FIG. 19, a number of switches 181, 183, and 185 can be installed between the appropriate triangle and the rectangle sections, as indicated in FIGS. 10 and 21.

Each of the switches 181, 183, and 185, in implementing the configuration of FIG. 13, passes the interconnection from the adjacent triangle to the right, and blocks the interconnection from the adjacent rectangle to the right. Switch 183, for example, passes the interconnection line 191 from triangle 193 to rectangle 195, and blocks the interconnection line 187 from rectangle 189 from passing to rectangle 195. When the other switches 181 and 185 operate similarly, the FIG. 21 configuration is effectively the same as that of FIG. 13.

Figure 22:
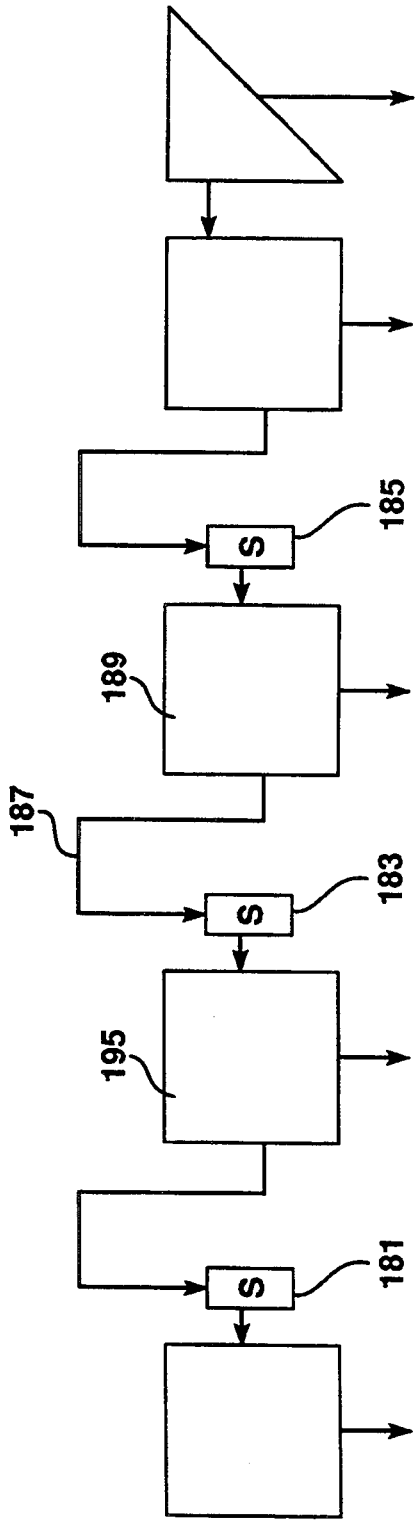
FIG. 22 is a block diagram showing the resulting CSA tree configuration when the switches bypass the triangle portions according to the presently preferred embodiment.

Similarly, in implementing the configuration of FIG. 19, each of the switches 181, 183, and 185 passes the interconnection from the adjacent rectangle to the right, and blocks the interconnection from the adjacent triangle to the right. Switch 183, for example, passes the interconnection line 187 from rectangle 189 to rectangle 195, and blocks the interconnection line 191 from triangle 193 from passing to rectangle 195. When the other switches 181 and 185 operate similarly, the FIG. 21 configuration is effectively the same as that of FIG. 19, which is effectively the same configuration as that shown in FIG. 22.

Looking now at FIGS. 23A, 23B, 24A and 24B, the four FIGS. show the particulars of the multiplier circuitry 501 of FIG. 10 for the sixty-four bit by sixty-four bit multiply configuration or the eighty bit by sixty-four bit multiply configuration. Bold lines show the direction of signal flow. The thirty-two lowest bits (bit numbers zero to thirty-one) are input into Booth/PPG 515 from line 503, and the sixteen highest bits (bit numbers forty-eight to sixty three) are input into Booth/PPG 509 from line 503. Booth/PPGs 511 and 513 receive inputs in a similar way to Booth/PPG 515.

Figure 23A:
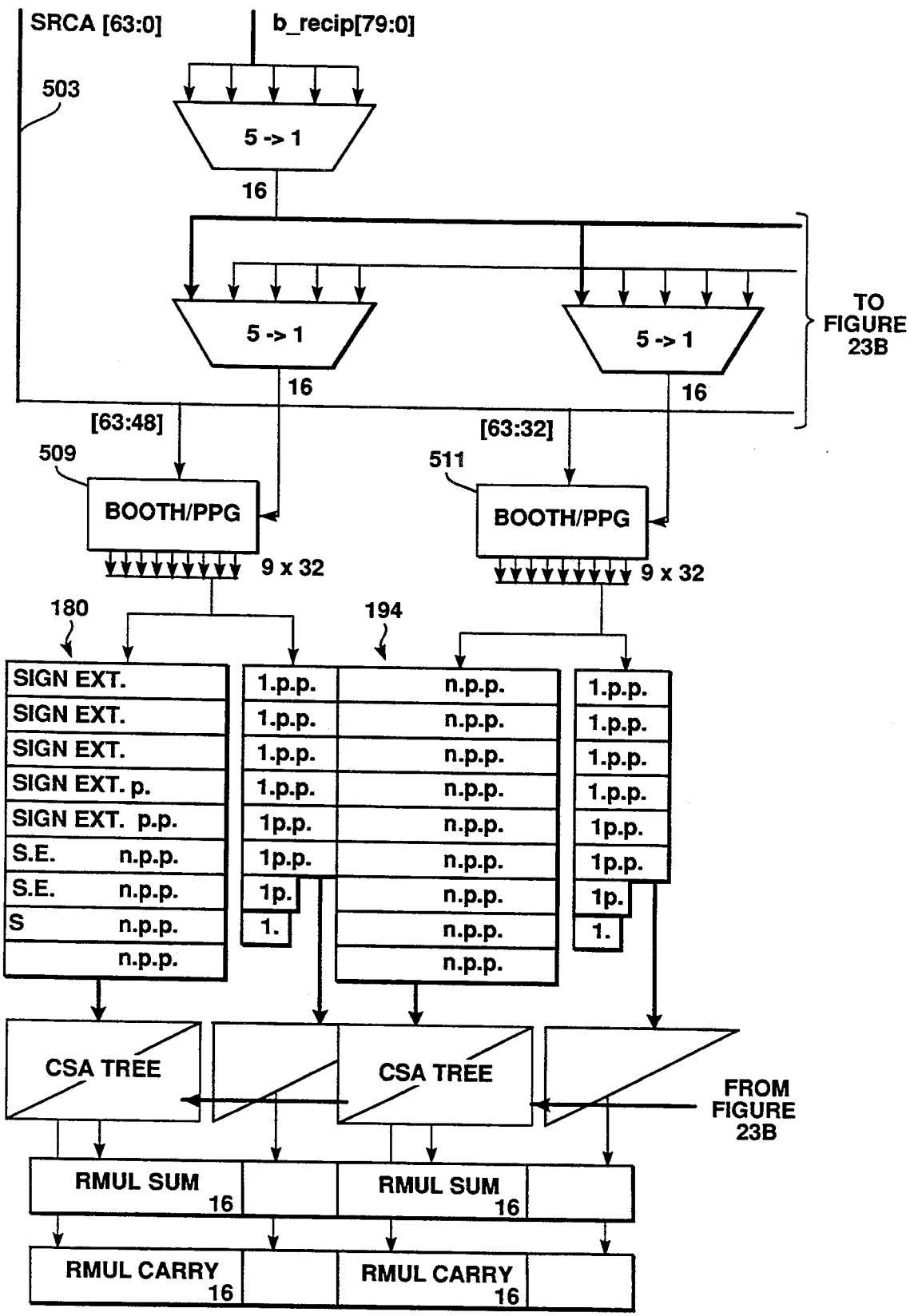
FIGS. 23A and 23B are a block diagram multiplier circuitry that is interior to the multiplier.
Figure 23B:
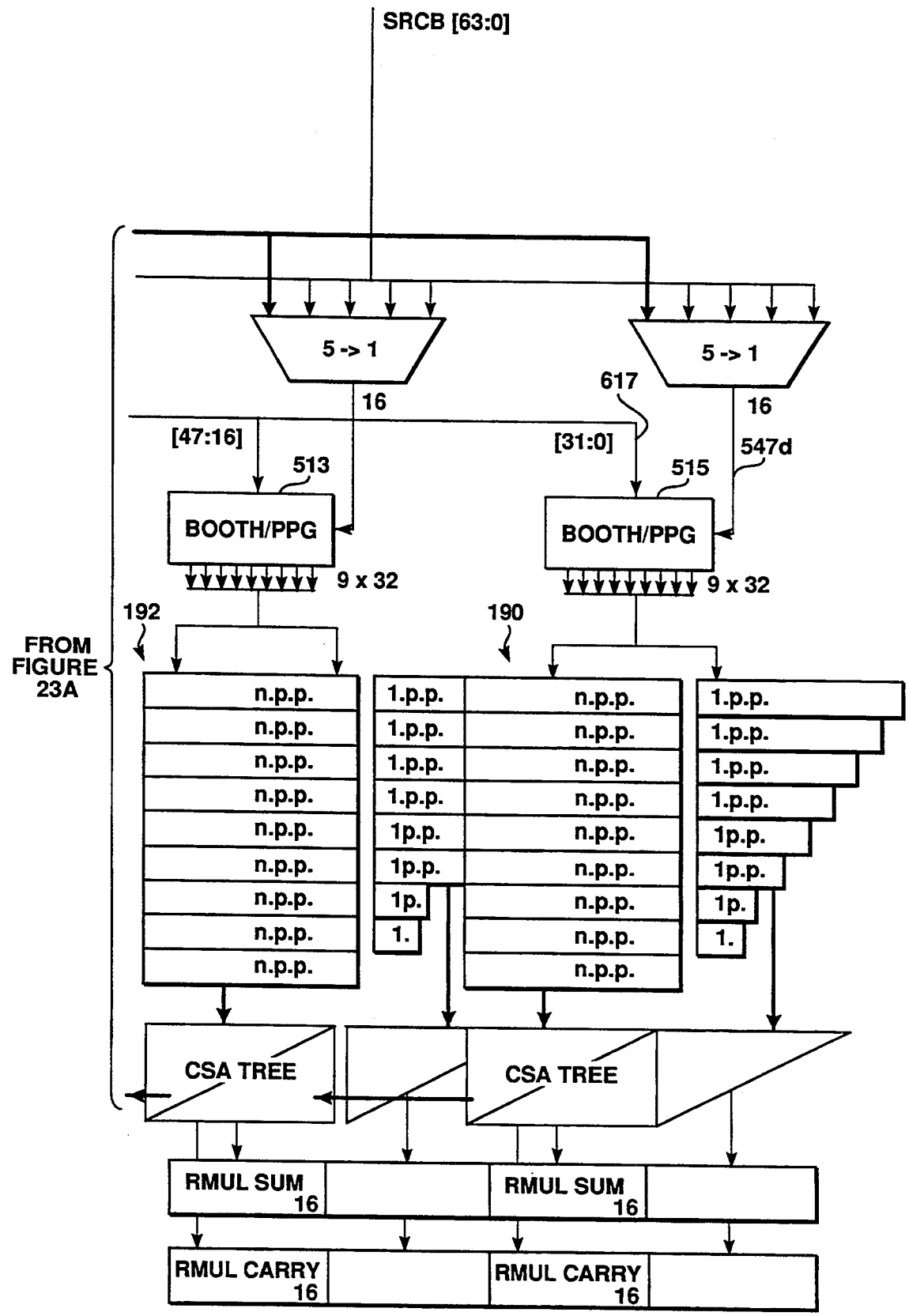
Figure 24A:
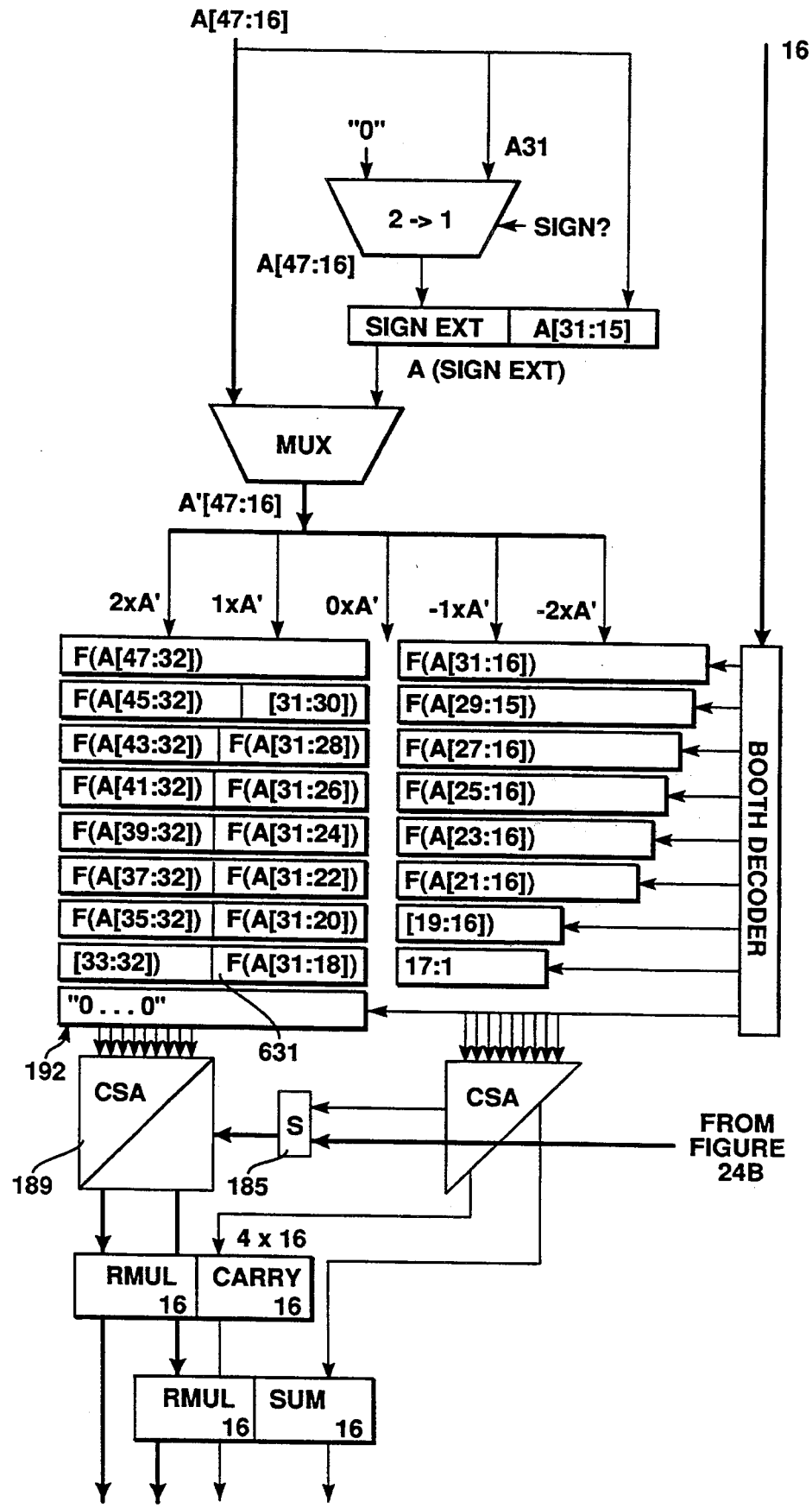
FIGS. 24A and 24B are a block diagram showing two of the four Booth/PPGs according to the presently preferred embodiment.
Figure 24B:
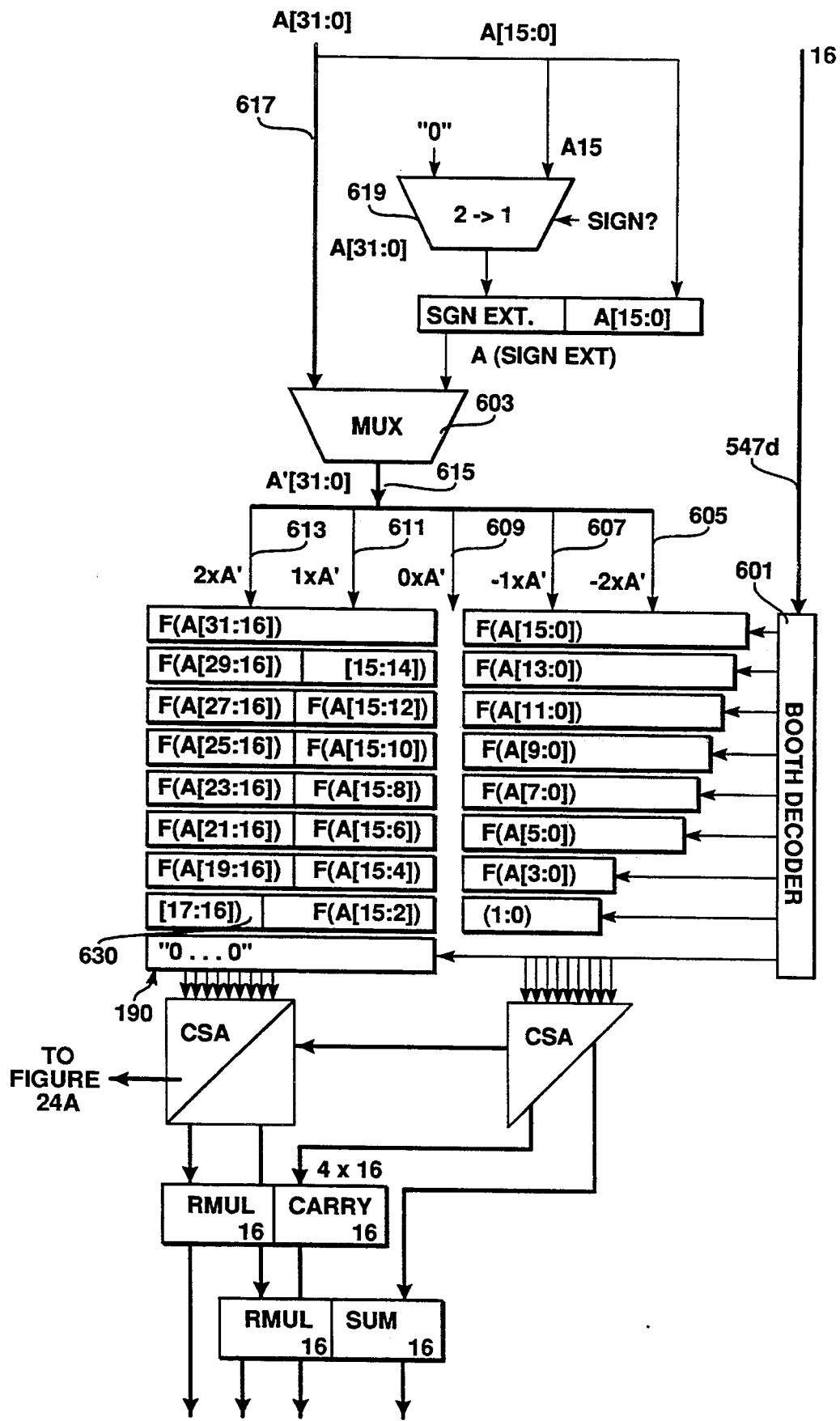

Of the four partial product multiplexers 180, 194, 192, and 190 shown in FIGS. 23A and 23B, partial product multiplexers 192 and 190 are shown in FIGS. 24A and 24B. Also the two Booth/PPGs 515 and 513 are shown in detail in FIGS. 24A and 24B. Booth/PPG 515, for instance, comprises partial product generating circuitry and a Booth decoder 601. As is known in the art, the partial product generating circuitry of Booth/PPG 515 inputs the thirty-two bits from line 617. Unlike the configuration of FIGS. 16A and 16B, however, a sign extension is not performed because the entire thirty-two bit number on line 617 is used. The thirty-two bit number is fed into multiplexer 603 and output on line 615. It is noted that a sign extension, as discussed above with reference to FIG. 16A and 16B, is performed in Booth/PPG 509 because this Booth/PPG handles only the most significant sixteen bits of the multiplicand.

As is known in the art, the Booth decoder 601 operates on the theory that instead of multiplying each single bit of the multiplier with the entire multiplicand to generate a number of partial products equal to the number of bits in the multiplier, each pair of bits of the multiplier can be multiplied with the multiplicand to generally yield half as many partial products. For reasons known in the art, the Booth decoder 601 is able to generate each partial product as a multiple of the multiplicand. Accordingly, each of the five lines 605, 607, 609, 611, and 613 hold a multiple of the multiplicand output on line 615 from multiplexer 603. That is, lines 605, 607, 609, 611, and 613 hold negative two times, negative one times, zero times, one times, and two times the multiplicand on line 615, respectively. Booth decoder 601 receives as input on line 547d the sixteen bit portion of the multiplier and selects from the different values on lines 605, 607, 609, 611, and 613 the values to be output as partial products. As shown in FIG. 24, each partial product is shifted two bit positions.

Looking now at the partial product multiplexers 190, each multiplexer is simply instructed by the Booth decoder 601 to choose an appropriate value from lines 605, 607, 609, 611, and 613 and to place that shifted value into the CSA tree. Thus, each of the nine multiplexers 190 inputs one of the values, shifted, on lines 605, 607, 609, 611, and 613 as a partial product into the CSA tree beneath.

It is noted that in this configuration, each partial product to be input into the CSA tree is derived from a thirty-two bit value. The partial products actually input into the CSA tree are shifted left, however, such that the lower partial products are no longer thirty-two bits long. Looking at the two partial product multiplexers 630 and 631, it is seen that this is not a problem because none of the bits are lost. That is, for example, partial product multiplexer 630 inputs bits zero to seventeen, and partial product multiplexer 631 inputs bits seventeen to thirty-three. Bit seventeen of multiplexer 631, however, is fed to the triangle portion of the CSA tree and therefore is not used.

In either the sixty-four by sixty four bit multiply configuration or the sixty-four by eighty bit configuration, the booth decoder for the ninth partial product is disabled and the ninth partial product is forced to zero. In addition, the highest bit of each sixteen bit section of the multiplier for a given multiply cycle is stored in a register of each Booth decoder for use in generating the partial products for the next multiply cycle. Thus, in the next multiply cycle, each booth decoder as is known in the art looks at the previous bit of the multiplier (relative to the bit it is processing), which in this case is the bit stored in each booth register from the previous multiply cycle. That is, in generating partial products for a second sixteen bit section of the multiplier, each Booth decoder remembers the highest bit of the first sixteen bit section of the multiplier. In effect, this treats the most significant bit of the first sixteen bit section of the multiplier as being directly adjacent to the to the least significant bit of the second sixteen bit section of the multiplier.

Figure 25A:
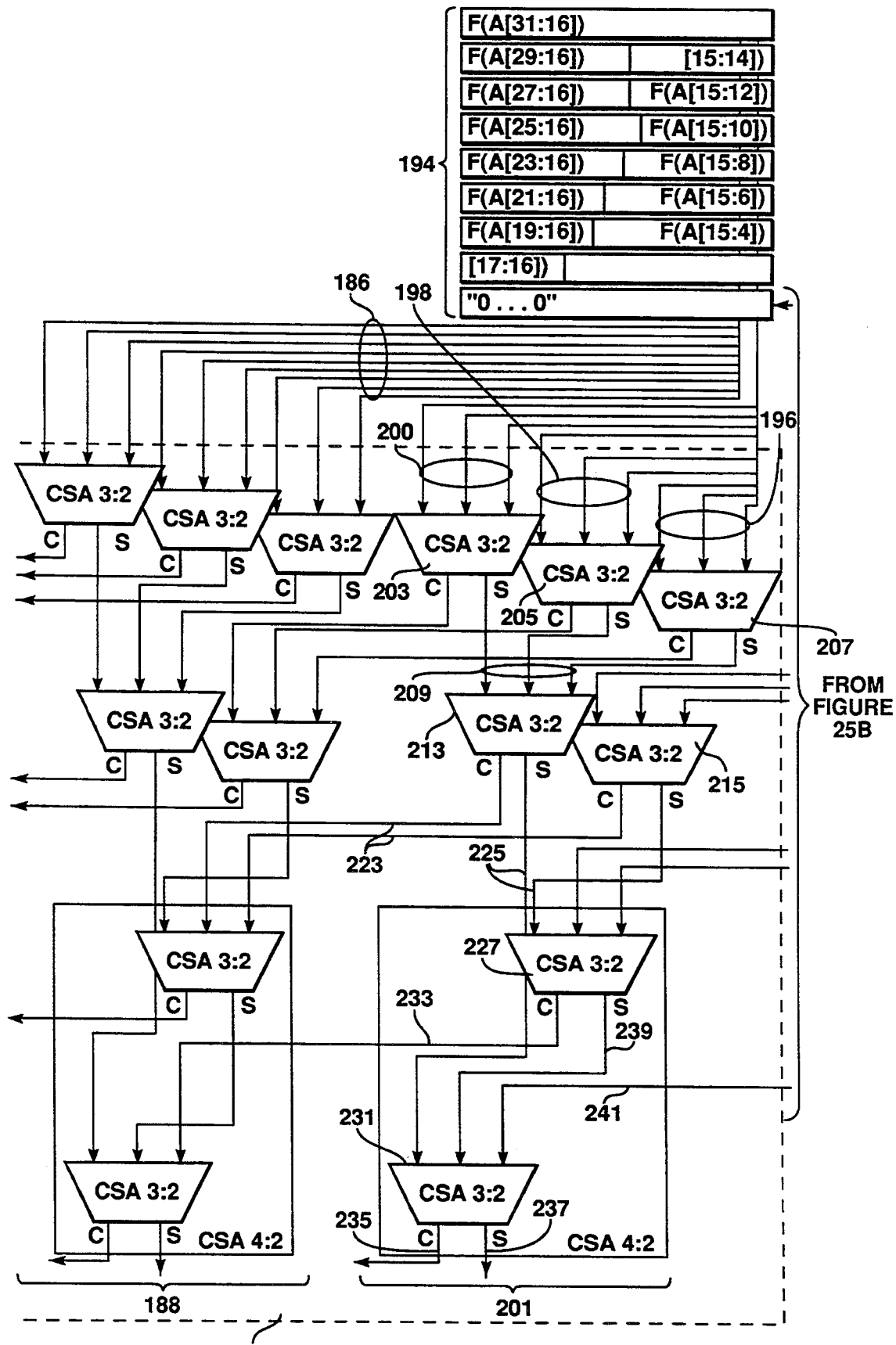
FIGS. 25A and 25B are a detailed block diagram of a switch between a triangle portion and a rectangle portion according to the presently preferred embodiment.
Figure 25B:
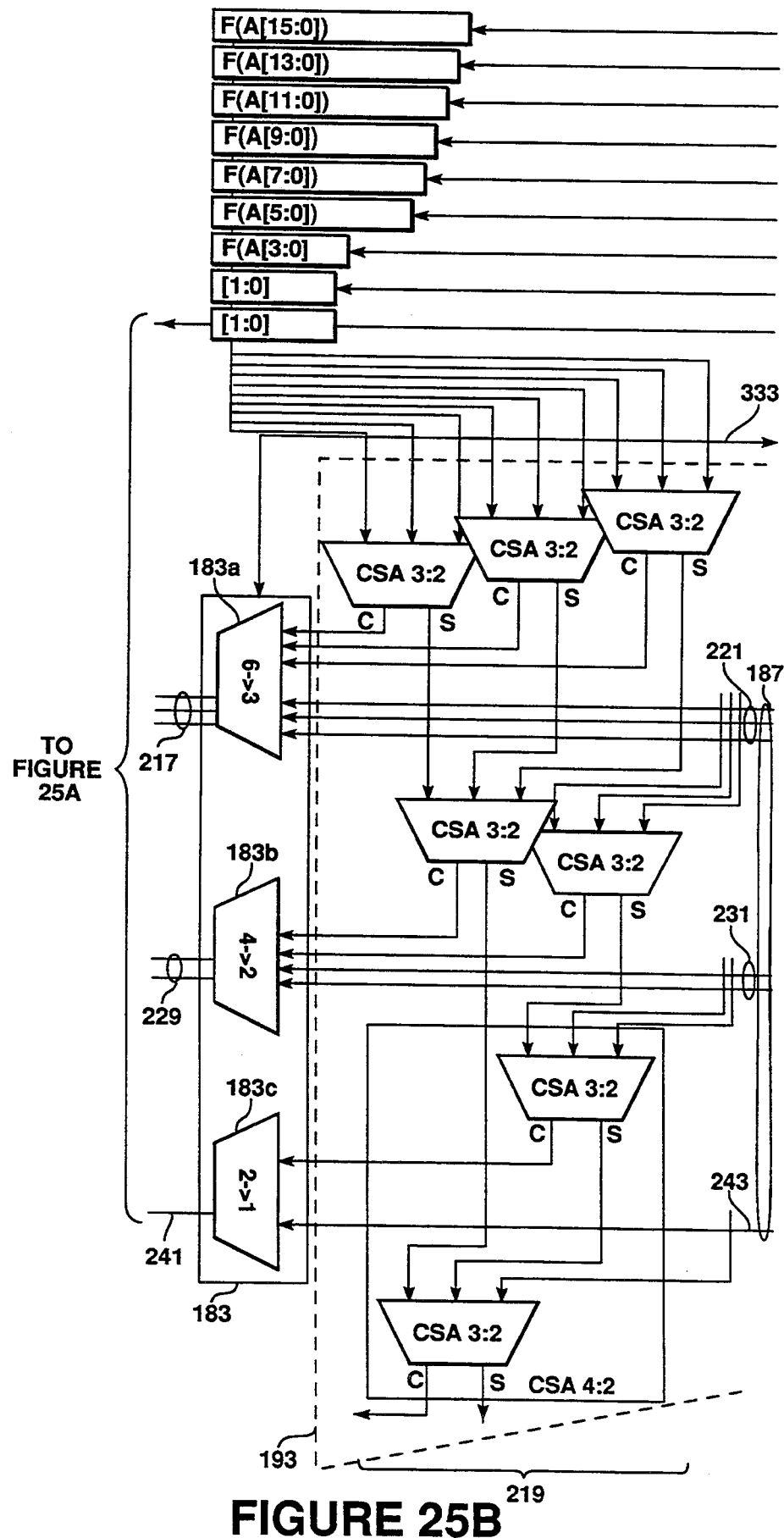

FIG. 25A and 25B are a detailed block diagram of switch 183, rectangle 195, and triangle 193 of FIG. 10 and FIG. 21. Recall that the rectangle 195 and triangle 193, in the sixteen bit by sixteen bit multiply mode for example, represent the circuit that is needed to sum the partial products which form the rectangle 195 and triangle 193. Moreover, regarding the exemplary rectangle 195 and triangle 193, each column represents a bit position and each row represents a partial product. Also, in the dot representation of FIG. 5, the dots on each row represent the bits of the partial product corresponding to that row. Thus, each bit represents an input into the CSA tree.

In the presently preferred embodiment of the sixty-four bit by sixteen bit multiply mode, there are nine partial products that are to be summed for the rectangle 195 but no partial products to be summed for the triangle 193, and each partial product to be summed by the rectangle 195 is sixteen bits long. Accordingly, each of the columns along the rectangle 195 of the CSA tree sums nine bits (one bit from each of the nine partial products).

Three columns at the interface of rectangle 195 and triangle 193 are depicted in FIG. 25A and 25B. Each column represents a bit position of the partial products. Column 201, for example, represents a bit position. In column 201, as in the other columns, nine numbers are input from multiplexers 194 and summed, as shown at 202. Each of the nine bits is a least significant bit of one of the nine partial products in one of the nine partial product multiplexers shown at 194.

Each set of three lines 196, 198, and 200 is input into a corresponding CSA 207, 205, and 203. Each CSA is basically a full adder with the standard logical equation for the sum and for the carry. Each CSA has three binary one bit inputs and produces a one bit sum and a one bit carry output. Thus, each of the CSAs 203, 205, and 207 takes three of the nine inputs and outputs a rsum and a carry. Accordingly, the three adders 203, 205, and 207 together input nine bits and output six bits. Three sums are output on the three lines 209, and the three carries are output on the three lines 211.

The three sums have the same significance as the bit position of the column, but the three carries have a higher significance. Because the carry outputs have a higher significance, they are summed with bits of the column of next higher significance. Accordingly, as shown in FIGS. 25A and 25B, the carry output is shifted left one column to the column of next higher significance 188. In column 188 nine numbers are input and summed, as depicted at 186. Each of the nine bits is a second least significant bit of one of the nine partial products in one of the nine partial product multiplexers shown at 194.

The three sums on lines 209 are input into the CSA 213, and the three carries on lines 217 are input into CSA 215. The three carries on lines 217 are shifted from the most significant column of rectangle 189 (see FIG. 21). Alternatively, in the quad sixteen bit by sixteen bit multiplication mode, the three carries on lines 217 are shifted from the most significant column 219 of triangle 193. It is noted that in either of the multiply modes besides the sixteen bit by sixteen bit multiply mode, the three carries on lines 217 are input from the left-most column of rectangle 189 via one of the three lines shown at 221. Thus, the six-to-three multiplexer represented at 183a determines whether the three carries from the left-most column of triangle 193 or the three carries from the left-most column of rectangle 189 are placed on the three lines shown at 217.

The two CSAs 213 and 215 together accept six inputs, generate two carries which are output on the two lines shown at 223, and generate two sums which are output on the two lines shown at 225. The two sums on lines 225 are input into the two CSAs 227 and 231, and the two carries on lines 229 which are shifted from the left-most column of rectangle 189 are input into CSA 227. Alternatively, in the quad sixteen bit by sixteen bit multiplication mode, the two carries on lines 229 are shifted from the most significant column 219 of triangle 193. It is noted that, in either of the multiply modes besides the sixteen bit by sixteen bit multiply mode, the two carries on lines 229 are input from the left-most column of rectangle 189 via the two lines shown at 231. Thus, the four-to-two multiplexer represented at 183b determines whether the two carries from the left-most column of triangle 193 or the two carries from the left-most column of rectangle 189 are placed on the two lines shown at 229. The carry from CSA 227 is output onto line 233, and the sum from CSA 227 is output onto line 239.

The CSA 231 accepts as input a sum from CSA 213 via one of the lines shown at 225, accepts as input a sum from CSA 227 via line 239, and accepts as a third input a carry on line 241 which is shifted from the left-most column of rectangle 189. Alternatively, in the quad sixteen bit by sixteen bit multiplication mode, the carry on line 241 is shifted from the most significant column 219 of triangle 193. It is noted that, in either of the multiply modes besides the sixteen bit by sixteen bit multiply mode, the carry on line 241 is input from the left-most column of rectangle 189 via line 243. Thus, the two-to-one multiplexer shown at 183c determines whether the carry from the left-most column of triangle 193 or the carry from the left-most column of rectangle 189 is placed on line 241. The CSA 231 outputs a carry on line 235 and a sum on line 237.

As to how the three multiplexers 183a-c in FIGS. 25A and 25B determine whether the six carries from the left-most column of triangle 193 or the six carries from the left-most column of rectangle 189 are placed on the six lines shown at 217 (three lines), 229 (two lines), and 241 (one line), a control signal is used to activate the switches and reconfigure the entire CSA trees accordingly. The control signal enters switch 183 via line 333.

The control signal can result from an operation code which specifies to the multiplexers 183a-c whether to multiply sixteen bit numbers or larger. Moreover, the three multiplexers 183a-c may also be told to re-configure the CSA trees by states in a state machine. The multiplier 470, is also used for doing division, for example, and in the division operation the reciprocal of the divisor may be multiplied with the dividend, thus yielding the quotient. In this case it is not directly the operation code which activates the three multipliers 183a-c, but rather it is part of a certain state of a state machine.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, although this disclosure shows an implementation which uses CSAs to configure partial product reduction trees, other adders may be implemented to achieve analogous results. A more complicated connection scheme, for example, incorporating more switches and more extensive routing would allow for utilization of more of each of the triangle portions such that the portions are more common and less of the triangular portion circuitry is by-passed in certain configurations. Other combinations of switches and interconnectivity can therefore be used with the present invention which may allow for more of the rectangular and triangular portions to be shared.

Moreover, whereas the presently preferred embodiment has been described for re-configuring partial product reduction trees with quad sixteen bit multiplication configurations, sixty-four by sixty-four bit multiplication configurations, and sixty-four by eighty bit multiplication configurations, the present invention is intended to cover partial product reduction trees which are re-configurable for other length multiplication operations and other combinations of those lengths. Therefore, reference to the details of the presently preferred embodiment are not intended to limit the scope of the claims which themselves recite only those features regarded as essential to the invention.

We claim:

1. A method of re-configuring a partial product reduction tree, wherein the partial product reduction tree is comprises f a plurality of carry-save adders, the method comprising the steps of:

grouping the partial product reduction tree into a plurality of rectangular groupings of carry-save adders and a plurality of triangular groupings of carry-save adders, wherein for each rectangular grouping of carry-save adders a corresponding triangular grouping of carry-save adders exists to form a plurality of pairs of groupings of carry-save adders;

placing a switch in each pair of groupings of carry-save adders between the rectangular grouping of carry-save adders and the triangular grouping of carry-save adders such that each switch has an adjacent rectangular grouping of carry-save adders and an adjacent triangular grouping of carry-save adders;

routing a first signal line between each switch and the switch's adjacent rectangular grouping of carry-save adders;

routing a second signal line between each switch and the switch's adjacent triangular grouping of carry-save adders;

routing a third signal line between at least one of the switches of one of the pairs of groupings of carry-save adders and another rectangular grouping of carry-save adders of another one of the pairs of groupings of carry-save adders which is at a lower-order position to the switch; and activating each of the switches to switch between the second and third signal lines connected to the switch.

2. The method of re-configuring a partial product reduction tree according to claim 8, wherein the step of activating each switch includes the step of activating each switch to enter either of a first mode wherein the switch passes a signal from the second signal line to the first signal line or a second mode wherein the switch passes a signal from the third signal line to the first signal line.

3. The method of re-configuring a partial product reduction tree according to claim 2, wherein
the step of activating each switch includes the step of activating each switch such that all of the switches are in the same mode at any given moment.

4. An apparatus for re-configuring a partial product reduction tree, wherein the partial product reduction tree is comprised of a plurality of carry-save adders, the apparatus comprising:

a partial product reduction tree arranged in a plurality of rectangular groupings of carry-save adders and a plurality of triangular groupings of carry-save adders, wherein for each rectangular grouping of carry-save adders a corresponding triangular grouping of carry-save adders exists to form a plurality of pairs of groupings of carry-save adders;

a switch in each pair of groupings of carry-save adders between the rectangular grouping of carry-save adders and the triangular grouping of carry-save adders such that each switch has an adjacent rectangular grouping of carry-save adders and an adjacent triangular grouping of carry-save adders;

a first signal line between each switch and the switch's adjacent rectangular grouping of carry-save adders;

a second signal line between each switch and the switch's adjacent triangular grouping of carry-save adders;

a third signal line between at least one of the switches of one of the pairs of groupings of carry-save adders and another rectangular grouping of carry-save adders of another one of the pairs of groupings of carry-save adders which is at a lower-order position to the switch; and means for directing each of the switches to switch between the second and third signal lines connected to the switch.

5. The apparatus for re-configuring a partial product reduction tree according to claim 9, wherein the means for directing includes mean for directing each switch to enter either of a first mode wherein the switch is configured to pass a signal from the second signal line to the first signal line or a second mode wherein the switch is configured to pass a signal from the third signal line to the first signal line.

6. The apparatus for re-configuring a partial product reduction tree according to claim 5, wherein all of the switches are in the same mode at any given moment.

* * * * *

UNITED STATES PATENT AND TRADEMARK OFFICE
CERTIFICATE OF CORRECTION

PATENT NO. : 5,343,416
DATED : 8/30/94
INVENTOR(S) : David Eising and Jehoshus S. Rotstain It is certified that error appears in the above-indentified patent and that said Letters Patent is hereby corrected as shown below:

Column 9, Line 40,   Insert --:-- after multiplications
Column 15, Line 11,  Delete "rsum"   Insert -- sum --
Column 16, Line 67,  Delete "comprises f"   Insert -- comprised of --
Column 17, Line 32,  Delete "8"   Insert --1--
Column 18, Line 34,  Delete "9"   Insert -- 4 --

Signed and Sealed this

Twenty-second Day of August, 1995

Attest:

BRUCE LEHMAN

Attesting Officer        Commissioner of Patents and Trademarks